(12) United States Patent
Weingaertner et al.

(10) Patent No.: US 11,322,767 B2
(45) Date of Patent: May 3, 2022

(54) SOLID OXIDE FUEL CELL SYSTEM WITH HYDROGEN PUMPING CELL WITH CARBON MONOXIDE TOLERANT ANODES AND INTEGRATED SHIFT REACTOR

(71) Applicant: BLOOM ENERGY CORPORATION, San Jose, CA (US)

(72) Inventors: David Weingaertner, Sunnyvale, CA (US); Matthias Gottmann, Sunnyvale, CA (US); Jayakumar Krishnadass, Sunnyvale, CA (US); Chockkalingam Karuppaiah, Fremont, CA (US); Arne Ballantine, Palo Alto, CA (US); Swaminathan Venkataraman, Cupertino, CA (US); Martin Perry, Mountain View, CA (US); John Fisher, San Jose, CA (US); Greg Young, Santa Cruz, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 5 days.

(21) Appl. No.: 16/840,801

(22) Filed: Apr. 6, 2020

(65) Prior Publication Data
US 2020/0328445 A1 Oct. 15, 2020

Related U.S. Application Data

(60) Provisional application No. 62/833,475, filed on Apr. 12, 2019.

(51) Int. Cl.
*H01M 8/1246* (2016.01)
*H01M 8/0668* (2016.01)
*H01M 8/0612* (2016.01)

(52) U.S. Cl.
CPC ....... *H01M 8/1246* (2013.01); *H01M 8/0612* (2013.01); *H01M 8/0668* (2013.01)

(58) Field of Classification Search
CPC . H01M 8/1246; H01M 8/0612; H01M 8/0668
See application file for complete search history.

(56) References Cited

U.S. PATENT DOCUMENTS

| | | | |
|---|---|---|---|
| 6,106,964 A | 8/2000 | Voss et al. |
| 6,924,053 B2 | 8/2005 | McElroy |
| 7,067,208 B2 | 6/2006 | Gottmann et al. |
| 7,132,182 B2 | 11/2006 | McElroy et al. |
| 7,422,810 B2 | 9/2008 | Venkataraman et al. |
| 7,482,078 B2 | 1/2009 | Sridhar et al. |
| 7,520,916 B2 | 4/2009 | McElroy et al. |
| 7,591,880 B2 | 9/2009 | Levan et al. |

(Continued)

OTHER PUBLICATIONS

Notification of Transmittal of the International Search Report and Written Opinion of the International Search Authority for International Patent Application No. PCT/US2020/026918, dated Jul. 28, 2020, 15 pages.

(Continued)

*Primary Examiner* — Olatunji A Godo
(74) *Attorney, Agent, or Firm* — Miles & Stockbridge P.C.

(57) ABSTRACT

A fuel cell system includes at least one of plural electrochemical pump separators to separate carbon dioxide from a fuel exhaust stream or a combination of a gas separator and a fuel exhaust cooler located outside a hotbox.

19 Claims, 9 Drawing Sheets

(56) References Cited

U.S. PATENT DOCUMENTS

| | | |
|---|---|---|
| 7,833,668 B2 | 11/2010 | Ballantine et al. |
| 7,883,803 B2 | 2/2011 | McElroy et al. |
| 8,101,307 B2 | 1/2012 | McElroy et al. |
| 8,673,510 B2 | 3/2014 | Pledger |
| 8,852,820 B2 | 10/2014 | Perry et al. |
| 9,190,673 B2 | 11/2015 | Venkataraman et al. |
| 9,287,572 B2 | 3/2016 | Weingaertner et al. |
| 9,461,320 B2 | 10/2016 | Ballantine et al. |
| 9,911,989 B2 | 3/2018 | McElroy et al. |
| 2003/0157386 A1 | 8/2003 | Gottmann et al. |
| 2003/0162067 A1 | 8/2003 | McElroy |
| 2003/0196893 A1* | 10/2003 | McElroy .................. C25B 9/73 204/266 |
| 2004/0191597 A1 | 9/2004 | McElroy |
| 2004/0202914 A1 | 10/2004 | Sridhar et al. |
| 2005/0164051 A1 | 7/2005 | Venkataraman et al. |
| 2007/0178338 A1 | 8/2007 | McElroy et al. |
| 2008/0241638 A1 | 10/2008 | McElroy et al. |
| 2010/0239924 A1 | 9/2010 | McElroy et al. |
| 2010/0266923 A1 | 10/2010 | McElroy et al. |
| 2012/0178003 A1 | 7/2012 | Venkataraman et al. |
| 2012/0270117 A9 | 10/2012 | Venkataraman et al. |
| 2013/0011757 A1* | 1/2013 | Perry .................. H01M 8/0612 429/419 |
| 2013/0108936 A1 | 5/2013 | McElroy et al. |
| 2015/0111121 A1 | 4/2015 | Weingaertner et al. |
| 2015/0228990 A1 | 8/2015 | Ballantine et al. |
| 2016/0248111 A1* | 8/2016 | Gasda .................. H01M 8/0668 |
| 2018/0131018 A1* | 5/2018 | Perry ................ H01M 8/04097 |

OTHER PUBLICATIONS

International Preliminary Report on Patentability and Written Opinion of the International Search Authority for International Patent Application No. PCT/US2020/026918, dated Oct. 21, 2021, 11 pages.

Malavasi, L. et al., "Oxide-Ion and Proton Conducting Electrolyte Materials for Clean Energy Applications: Structural and Mechanistic Features," Chem. Soc. Rev., vol. 39, pp. 4370-4387, (2010), https://doi.org/10_1039/B915141A.

U.S. Appl. No. 62/874,039, filed Jul. 15, 2019, Bloom Energy Corporation.

U.S. Appl. No. 16/790,269, filed Feb. 13, 2020, Bloom Energy Corporation.

* cited by examiner

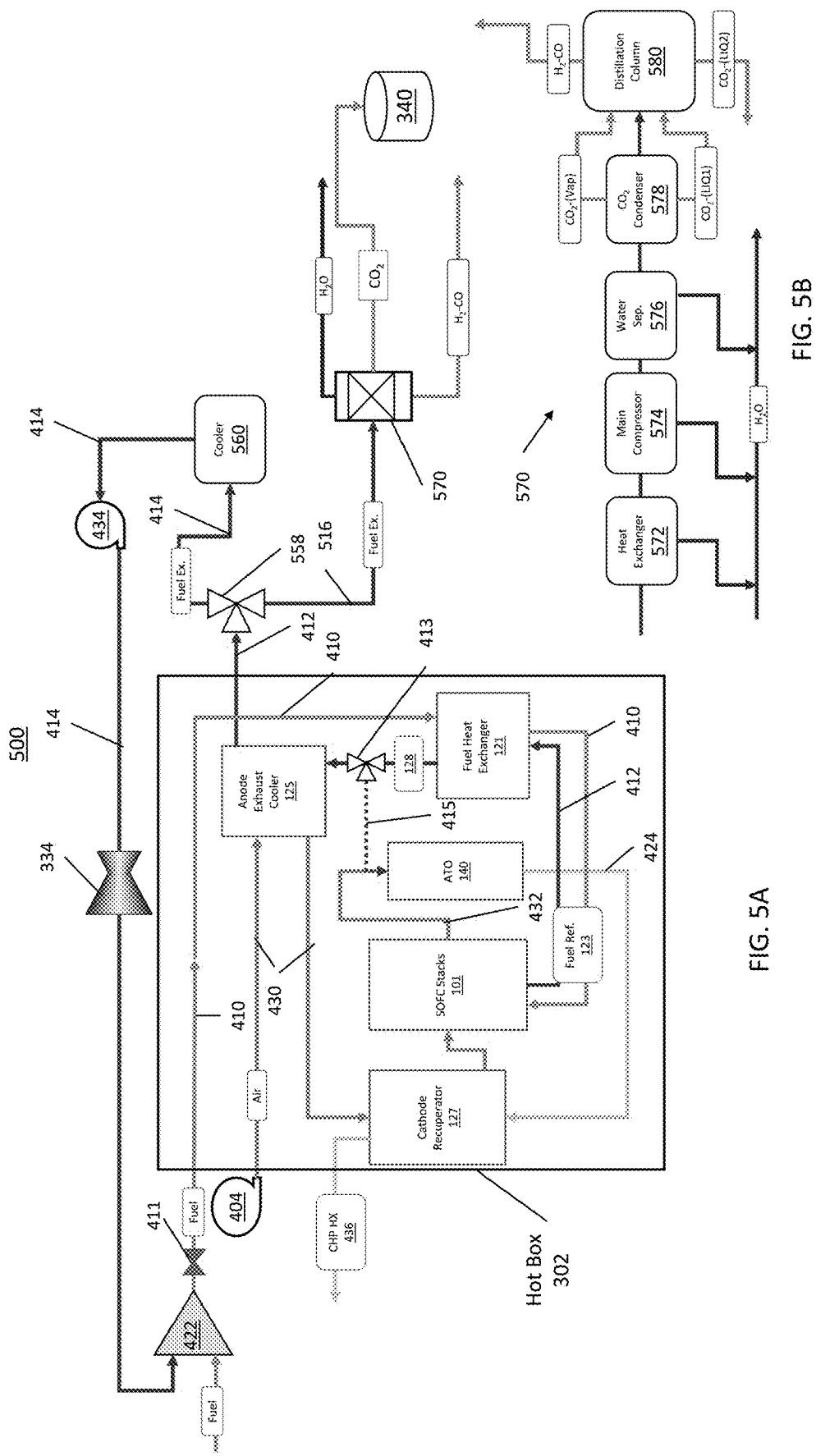

SOLID OXIDE FUEL CELL SYSTEM WITH HYDROGEN PUMPING CELL WITH CARBON MONOXIDE TOLERANT ANODES AND INTEGRATED SHIFT REACTOR

BACKGROUND

The present invention relates generally to the field of gas separation and more particularly to fuel cell systems with electrochemical fuel exhaust fuel recovery.

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

BRIEF DESCRIPTION OF THE DRAWINGS

FIGS. 3, 4, 5A, 5B, 5C, 6, and 7 are schematic diagrams of fuel cell systems, according to various embodiments of the present disclosure.

SUMMARY

Figure 1:
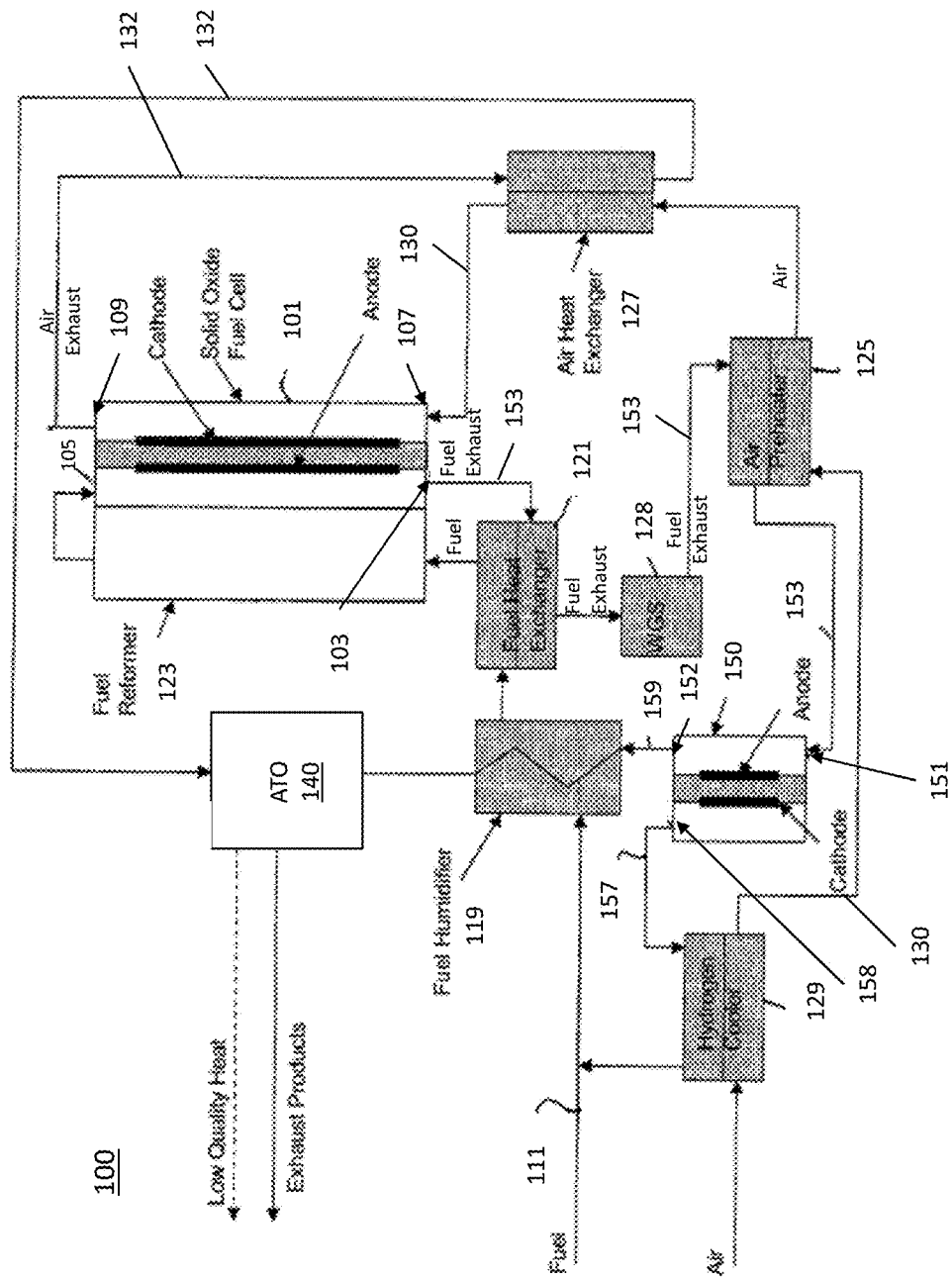
FIGS. 1 and 2 are schematic diagrams of fuel cell systems of the first and second comparative embodiments of a fuel cell system.

According to various embodiments of the present disclosure, a fuel cell system includes a fuel cell stack; an anode tail gas oxidizer (ATO); first and second electrochemical hydrogen pump separators that each include an electrolyte disposed between a cathode and an anode; a fuel exhaust conduit that fluidly connects a fuel exhaust outlet of the fuel cell stack to a splitter; a first separation conduit that fluidly connects an outlet of the splitter to an anode inlet of the first hydrogen pump separator; a second separation conduit that fluidly connects an anode outlet of the first hydrogen pump separator to an anode inlet of the second pump separator; an ATO inlet conduit that fluidly connects a cathode outlet of the first electrochemical pump separator to the anode tail gas oxidizer; a hydrogen conduit that fluidly connects a cathode outlet of the second electrochemical pump separator to a fuel inlet of the fuel cell stack; and a byproduct conduit that fluidly connects an anode outlet of the second electrochemical pump separator to a carbon dioxide use or storage device.

According to various embodiments of the present disclosure, a fuel cell system comprises a hotbox; a fuel cell stack disposed in the hotbox; an anode tail gas oxidizer (ATO) disposed in the hotbox; a fuel inlet conduit fluidly connecting a fuel source to an inlet of the fuel cell stack; a fuel exhaust condenser disposed outside of the hotbox configured to condense water from the fuel exhaust generated by the fuel cell stack and output from the hotbox; a fuel exhaust separator configured to remove liquid water from fuel exhaust received from the fuel exhaust condenser; a fuel exhaust conduit fluidly connecting a fuel exhaust outlet of the fuel cell stack to the fuel exhaust condenser; a recycling conduit fluidly connecting the fuel exhaust separator to the fuel inlet conduit; an ATO inlet conduit fluidly connecting the recycling conduit to the ATO; and a recycling valve configured to selectively control fuel exhaust flow through the recycling conduit and into the ATO inlet conduit.

According to various embodiments of the present disclosure, a fuel cell system comprises a hotbox; a fuel cell stack disposed in the hotbox; an anode tail gas oxidizer (ATO) disposed in the hotbox; a fuel inlet conduit fluidly connecting a fuel source to an inlet of the fuel cell stack; an external anode exhaust cooler located outside the hotbox; a fuel exhaust conduit fluidly connecting a fuel exhaust outlet of the fuel cell stack to the external anode exhaust cooler; a recycling conduit fluidly connecting the external anode exhaust cooler to the fuel inlet conduit; a fuel exhaust processing conduit fluidly connected to the recycling conduit; and a gas separator fluidly connected to the fuel exhaust processing conduit and configured to separate fuel exhaust received from the fuel exhaust processing conduit into streams of liquid water, carbon dioxide, and hydrogen.

DETAILED DESCRIPTION OF THE PREFERRED EMBODIMENTS

As set forth herein, various aspects of the disclosure are described with reference to the exemplary embodiments and/or the accompanying drawings in which exemplary embodiments of the invention are illustrated. This invention may, however, be embodied in many different forms and should not be construed as limited to the exemplary embodiments shown in the drawings or described herein. It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It will also be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Ranges can be expressed herein as from "about" one particular value, and/or to "about" another particular value. When such a range is expressed, examples include from the one particular value and/or to the other particular value. Similarly, when values are expressed as approximations, by use of the antecedent "about" or "substantially" it will be understood that the particular value forms another aspect. In some embodiments, a value of "about X" may include values of +/−1% X. It will be further understood that the endpoints of each of the ranges are significant both in relation to the other endpoint, and independently of the other endpoint.

Herein, the term "fuel exhaust" may refer to exhaust output from anodes of a fuel cell stack and may include unreacted fuel provided to the stack. The term "air exhaust" may refer to exhaust output from cathodes of a fuel cell stack and/or output from an anode tail gas oxidizer.

The first and second comparative embodiments of the invention illustrate how the electrochemical pump separator is used together with a fuel cell system, such as a solid oxide fuel cell (SOFC) system. It should be noted that other fuel cell systems may also be used.

In the system of the first embodiment, a fuel humidifier is used to humidify the fuel inlet stream provided into the fuel cell stack. In the system of the second embodiment, the fuel humidifier may be omitted. A portion of the fuel cell stack fuel exhaust stream is directly recycled into the fuel inlet stream to humidify the fuel inlet steam. Another portion of the fuel cell stack fuel exhaust stream is provided into the separator, and the separated hydrogen is then provided into the fuel inlet stream.

FIG. 1 is a schematic of a fuel cell system 100 described in U.S. Pat. No. 8,101,307 B2, incorporated herein by reference in its entirety. The system 100 contains a fuel cell stack 101, such as a solid oxide fuel cell stack (illustrated schematically to show one solid oxide fuel cell of the stack containing a ceramic electrolyte, such as yttria stabilized zirconia (YSZ), an anode electrode, such as a nickel-YSZ cermet, and a cathode electrode, such as lanthanum strontium manganite).

The system 100 also contains an electrochemical pump separator 150 that electrochemically separates hydrogen from the fuel exhaust stream. The pump separator 150 may comprise any suitable proton exchange membrane device comprising a polymer electrolyte. The hydrogen diffuses through the polymer electrolyte under an application of a potential difference between anode and cathode electrodes located on either side of the electrolyte. Preferably, the pump separator 150 comprises a stack of carbon monoxide tolerant electrochemical cells, such as a stack of high-temperature, low-hydration ion exchange membrane cells. This type of cell includes a non-fluorinated ion exchange ionomer membrane, such as, for example, a polybenzimidazole (PBI) membrane, located between anode and cathode electrodes. The membrane is doped with an acid, such as sulfuric or phosphoric acid. An example of such cell is disclosed in US published application US 2003/0196893 A1, incorporated herein by reference in its entirety. These cells generally operate in a temperature range of above 100° C. to about 200° C. Thus, the heat exchangers in the system 100 preferably keep the fuel exhaust stream at a temperature of about 120° C. to about 200° C., such as about 160° C. to about 190° C.

The system 100 also contains a first fuel exhaust conduit 153 that fluidly connects a fuel exhaust outlet 103 of the fuel cell stack 101 an anode inlet 151 of the pump separator 150. The system 100 also contains a product conduit 157 that fluidly connects a cathode outlet 158 of the pump separator 150 to a fuel inlet conduit 111 that fluidly connects a fuel inlet 105 of the stack 101 to an external fuel source. The system 100 also contains a separator exhaust conduit 159 that fluidly connects an anode outlet 152 of the pump separator 150 to an anode tail gas oxidizer (ATO) 140 or to an atmospheric vent. Preferably, the system 100 lacks a compressor that, in operation, compresses the fuel exhaust, such that compressed fuel exhaust stream is provided to the pump separator 150.

The system 100 further includes a fuel humidifier 119 operatively connected to the fuel inlet conduit 111 and the separator exhaust conduit 159. In operation, the fuel humidifier 119 humidifies fuel in fuel inlet conduit 111, which includes recycled hydrogen, using water vapor contained the separator exhaust output to the separator exhaust conduit 159. The fuel humidifier 119 may comprise a polymeric membrane humidifier, such as a Nafion® membrane humidifier, an enthalpy wheel or a plurality of water adsorbent beds, as described for example in U.S. Pat. No. 6,106,964 and in U.S. application Ser. No. 10/368,425, both incorporated herein by reference in their entirety. For example, one suitable type of humidifier comprises a water vapor and enthalpy transfer Nafion® based, water permeable membrane available from Perma Pure LLC. The fuel humidifier 119 passively transfers water vapor and enthalpy from the fuel exhaust stream into the fuel inlet stream to provide a 2 to 2.5 steam to carbon ratio in the fuel inlet stream. The temperature of the fuel in the fuel inlet conduit 111 may be raised to about 80° C. to about 90° C., by the fuel humidifier 119.

The system 100 also contains a recuperative heat exchanger 121 (e.g., anode recuperator) operatively connected to the fuel inlet conduit 111 and the fuel exhaust conduit 153. The heat exchanger 121 heats the fuel in the fuel inlet conduit 111 using heat extracted from the fuel exhaust in the fuel exhaust conduit 103. The heat exchanger 121 helps to raise the temperature of the incoming fuel and reduces the temperature of the fuel exhaust, so that it may be further cooled in the condenser and such that it does not damage the fuel humidifier 119.

If the fuel cells are external fuel reformation type cells, then the system 100 contains a fuel reformer 123. The reformer 123 reforms a hydrocarbon fuel inlet stream into hydrogen and carbon monoxide containing fuel stream which is then provided into the stack 101. The reformer 123 may be heated radiatively, convectively and/or conductively by the heat generated in the fuel cell stack 101 and/or by the heat generated in an optional ATO 140, as described in U.S. patent application Ser. No. 11/002,681, filed Dec. 2, 2004, incorporated herein by reference in its entirety. Alternatively, the external fuel reformer 123 may be omitted if the stack 101 contains cells of the internal reforming type, where reformation occurs primarily within the fuel cells of the stack.

The system 100 also includes an air inlet conduit 130 fluidly connected to an air inlet 107 of the stack 101. Optionally, the system 100 includes an air preheater heat exchanger 125, which may also be referred to as an anode exhaust cooler, operatively connected to the air inlet conduit 130 and configured to preheat the air in the air inlet conduit 130 using heat extracted from the fuel exhaust in the fuel exhaust conduit 153. If desired, this heat exchanger 125 may be omitted.

The system 100 also includes an air exhaust conduit 132 fluidly connecting an air exhaust outlet 109 of the stack 101 to the ATO 140. The system 100 preferably contains an air heat exchanger 127 operatively connected to the air inlet conduit 130 and the air exhaust conduit 132. This heat exchanger 127 further heats the air in the air inlet conduit 130 using heat extracted from the fuel cell stack air exhaust (i.e., oxidizer or cathode exhaust) in the air exhaust conduit 132. If the preheater heat exchanger 125 is omitted, then the air is provided directly into the heat exchanger 127 by a blower or other air intake device.

The system 100 also optionally includes a hydrogen cooler heat exchanger 129 operatively connected to the product conduit 157 and the air inlet conduit 130. The heat exchanger 129 extracts heat from the separated hydrogen output from the pump separator 150, using air flowing through the air inlet conduit 130.

The system 100 may also contain an optional water-gas shift (WGS) reactor 128 operatively connected to the fuel exhaust conduit 153. The WGS reactor 128 may be any suitable device that converts at least a portion of the water in the fuel exhaust into free hydrogen ($H_2$). For example, the WGS reactor 128 may comprise a tube or conduit containing a catalyst that converts some or all of the carbon monoxide and water vapor in the fuel exhaust stream into carbon dioxide and hydrogen. Thus, the WGS reactor 128 increases the amount of hydrogen in the fuel exhaust. The catalyst may be any suitable catalyst, such as an iron oxide or a chromium-promoted iron oxide catalyst. The WGS reactor 128 may be operatively connected to the fuel exhaust conduit 153, between the fuel heat exchanger 121 and the air preheater heat exchanger 125.

The system 100 may operate as follows. A fuel is provided to the fuel cell stack 101 through fuel inlet conduit 111. The fuel may comprise any suitable hydrocarbon fuel, including but not limited to methane, natural gas which contains methane with hydrogen and other gases, propane or other biogas, or a mixture of a carbon fuel, such as carbon monoxide, oxygenated carbon containing gas, such as methanol, or other carbon containing gas with a hydrogen containing gas, such as water vapor, $H_2$ gas or their mixtures. For example, the mixture may comprise syngas derived from coal or natural gas reformation.

As the fuel stream passes through the humidifier 119, the fuel stream is humidified. The humidified fuel stream then passes through the fuel heat exchanger 121 where the humidified fuel is heated by the fuel cell stack fuel exhaust. The heated and humidified fuel is then provided into the fuel reformer 123, which is preferably an external reformer. For example, the fuel reformer 123 may comprise a reformer described in U.S. patent application Ser. No. 11/002,681, filed on Dec. 2, 2004, incorporated herein by reference in its entirety.

The fuel reformer 123 may be any suitable device that is capable of partially or wholly reforming a hydrocarbon fuel to form a carbon-containing and free-hydrogen-containing fuel. For example, the fuel reformer 123 may be any suitable device which can reform a hydrocarbon gas into a gas mixture of free hydrogen and a carbon containing gas. For example, the fuel reformer 123 may comprise a catalyst coated passage where a humidified biogas, such as natural gas, is reformed via a steam-methane reformation reaction to form free hydrogen, carbon monoxide, carbon dioxide, water vapor and optionally a residual amount of unreformed biogas. The free hydrogen and carbon monoxide are then provided into the fuel (i.e., anode) inlet 105 of the fuel cell stack 101. Thus, with respect to a fuel flow direction in the fuel inlet conduit 111, the humidifier 119 is located upstream of the heat exchanger 121, which is located upstream of the reformer 123, which is located upstream of the stack 101.

The air or other oxygen containing gas (i.e., oxidizer) that is provided to the stack 101 through the air inlet conduit 130 is heated by the air heat exchanger 127, using the cathode exhaust in the air exhaust conduit 132. If desired, the air in the air inlet conduit 130 may also pass through the hydrogen cooler heat exchanger 129 and/or through the air preheater heat exchanger 125, to further increase the temperature of the air stream, before providing the air into the stack 101.

During operation, the stack 101 generates electricity using the provided fuel and air, and generates the fuel exhaust and the air exhaust. The fuel exhaust may contain hydrogen, water vapor, carbon monoxide, carbon dioxide, some unreacted hydrocarbon fuel such as methane, and other reaction by-products and impurities. The fuel exhaust may include about 25% of the fuel provided to the stack 101.

The fuel exhaust is output from the fuel exhaust outlet 103 and provided to the pump separator 150 by the fuel exhaust conduit 153. The pump separator 150 electrochemically separates at least a portion of the hydrogen ($H_2$) contained in the fuel exhaust. The separated hydrogen is output from the cathode outlet 158 and provided to the fuel inlet conduit 111 by the product conduit 157 where the hydrogen and is mixed with incoming fresh fuel. Preferably, the hydrogen is provided to the fuel inlet conduit 111 upstream of the humidifier 119.

This fuel exhaust stream is first provided into the heat exchanger 121, where its temperature is lowered, preferably to less than 200° C., while the temperature of the incoming fuel is raised. If the WGS reactor 128 and the air preheater heat exchanger 125 are present, then the fuel exhaust is provided through the WGS reactor 128 to convert at least a portion of the water vapor and a majority of the residual carbon monoxide into carbon dioxide and hydrogen. The temperature of the fuel exhaust is then further reduced while passing through the heat exchanger 125, by transferring heat to the air in the air inlet conduit 130. The temperature of the fuel exhaust may be reduced to from about 90 to 110° C., for example.

The fuel exhaust is then provided to the anode inlet 151 of the pump separator 150 via conduit 153. The pump separator 150 may be configured to separate a majority of the hydrogen from the fuel exhaust, such as about 85% of the hydrogen in the fuel exhaust stream. In particular, the hydrogen diffuses through the electrolyte of the cells in the pump separator 150, while allowing the water vapor, carbon dioxide, carbon monoxide and remaining hydrocarbon gas in the fuel exhaust to be provided to the humidifier 119 by exhaust conduit 159.

In the fuel humidifier 119, a portion of the water vapor in the fuel exhaust is transferred to the fuel in the fuel inlet conduit 111 to humidify the fuel. The fuel may be humidified to 80° C. to 90° C. dew point. The remainder of the fuel exhaust stream is then provided into the ATO 140 along with the air (i.e., cathode) exhaust from the stack 101, where the gasses are burned to provide low quality heat. The heat from the ATO 140 may be used to heat the reformer 123, it may be provided to other parts of the system 100, or may be provided to devices outside the system 100, such as a building heating system.

The hydrogen separated by the pump separator 150 is output from the cathode outlet 158 and provided by the product conduit 157 to the fuel inlet conduit 111, where it is mixed with incoming fuel. If desired, prior to being provided to the fuel inlet conduit 111, the hydrogen maybe cooled in heat exchanger 129, where the hydrogen stream exchanges heat with air in the air inlet conduit 130. The temperature of the hydrogen is lowered in the heat exchanger 129 before being provided into the fuel inlet conduit 111. Thus, the hydrocarbon fuel is mixed with a low dew point, near ambient temperature, recycled hydrogen recovered from the anode exhaust gas with the pump separator 150.

Thus, with respect to the flow direction of the fuel exhaust, the heat exchanger 121 is located upstream of the reactor 128, which is located upstream of the heat exchanger 125, which is located upstream of the pump separator 150, which is located upstream of the humidifier 119 and the fuel inlet conduit 111.

Figure 2:
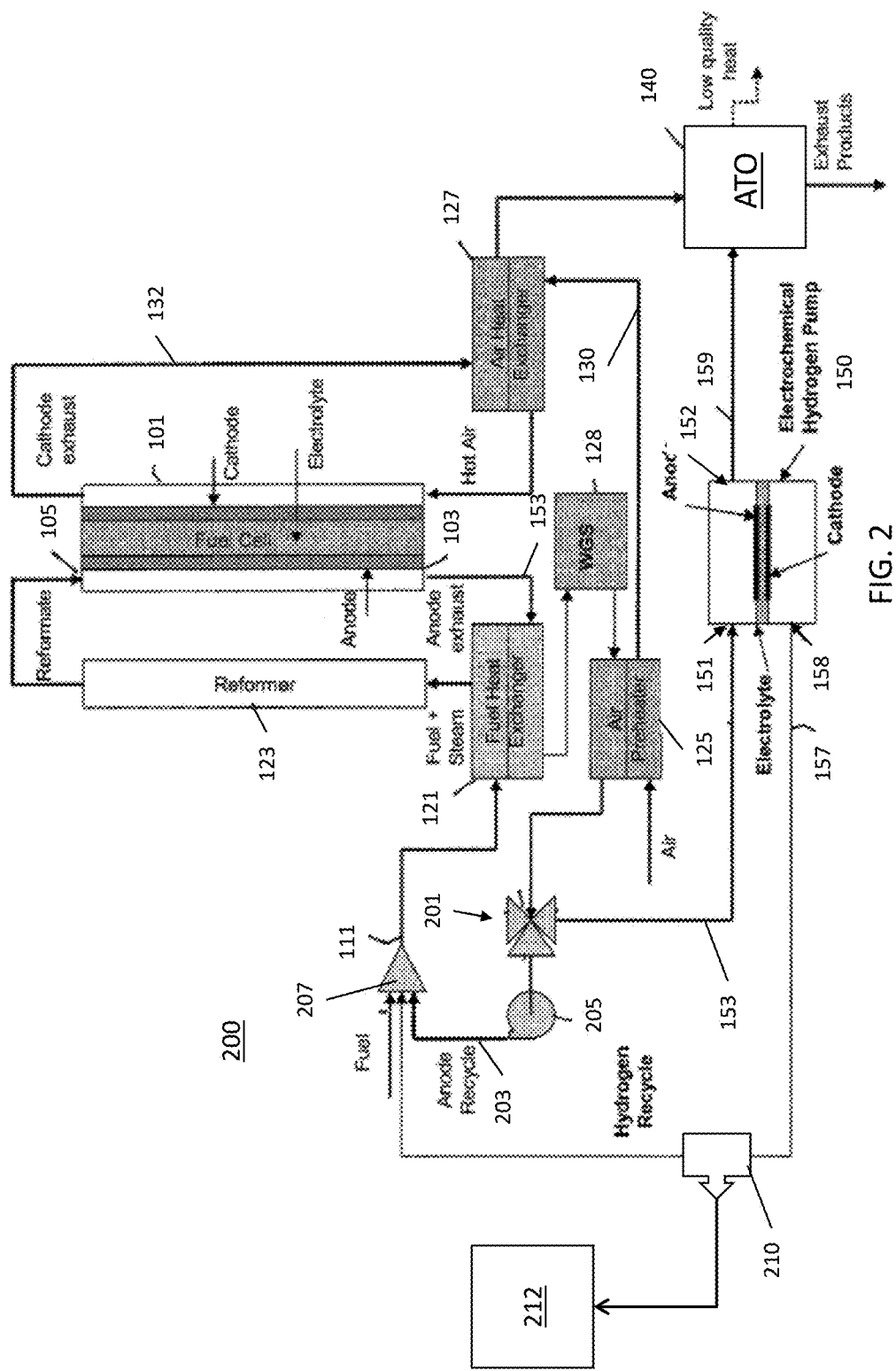

FIG. 2 is a schematic of a fuel cell system 200 described in U.S. Pat. No. 8,101,307 B2. The system 200 is similar to system 100 and contains a number of components in common. Those components which are common to both systems 100 and 200 are numbered with the same numbers in FIGS. 1 and 2 and will not be described further.

One difference between systems 100 and 200 is that that system 200 preferably, but not necessarily lacks, the humidifier 119. Instead, a portion of the water vapor containing stack fuel exhaust stream is directly recycled into the stack fuel inlet stream. The water vapor in the fuel exhaust stream is sufficient to humidify the fuel inlet stream.

The system 200 may contain a fuel exhaust splitter 201, a recycling conduit 203, a blower or compressor 205, and a mixer 207. The splitter 201 may be a computer or operator controlled multi-way valve, for example a three-way valve, or another fluid splitting device. The splitter 201 may be operatively connected to the fuel exhaust conduit 153 and the recycling conduit 203. In particular, the splitter 201 may be configured to divert all or a portion of the fuel exhaust in the fuel exhaust conduit 153 to the recycling conduit 203.

The mixer 207 may be operatively connected to the fuel inlet conduit 111, the recycling conduit 203, and the product conduit 157. The recycling conduit 203 may fluidly connect the splitter 201 to the mixer 207. The mixer 207 may be configured to mix fresh fuel with fuel exhaust provided by the recycling conduit 203 and/or hydrogen provided by the product conduit 157.

The blower or compressor 205 may be operatively connected to the recycling conduit 203. The blower or compressor 205 may be configured to move the fuel exhaust through the recycling conduit 203 to the mixer 207. In operation, the blower or compressor 205 controllably provides a desired amount of the fuel exhaust to the fuel inlet conduit 111, via the mixer 207.

The method of operating the system 200 is similar to the method of operating the system 100. One difference is that the fuel exhaust is separated into at least two streams by the splitter 201. The first fuel exhaust stream is recycled to the fuel inlet stream, while the second stream is directed into the pump separator 150 where at least a portion of hydrogen contained in the second fuel exhaust stream is electrochemically separated from the second fuel exhaust stream. The hydrogen separated from the second fuel exhaust stream is then provided into the fuel inlet conduit 111 by the product conduit 157. For example, between 50% and 70%, such as about 60% of the fuel exhaust may be provided to the blower or compressor 205, while the remainder may be provided toward the pump separator 150.

Preferably, the fuel exhaust first flows through the heat exchangers 121 and 125, and the WGS reactor 128, before being provided into the splitter 201. The fuel exhaust may be cooled to about 200° C. or less, such as to about 120° C. to about 180° C., in the heat exchanger 125, and prior to being provided into the splitter 201 where it is divided into two streams. This allows the use of a low temperature blower 205 to controllably recycle a desired amount of the fuel exhaust stream into the fuel inlet conduit 111, since such a blower may be adapted to move a gas stream that has a temperature of about 200° C. or less.

The blower or compressor 205 may be computer or operator controlled and may vary the amount of the fuel exhaust stream being provided into the fuel inlet stream depending on the conditions described below. In some embodiments, the system 200 may optionally include a selector valve 210 operatively connected to the product conduit 157. The selector valve 210 may be fluidly connected to an auxiliary device 212, such as a hydrogen storage device a hydrogen using device, such as a PEM fuel cell in a vehicle or another hydrogen using device or to a hydrogen storage vessel. The selector valve 210 may be configured to divert a selected amount of the hydrogen in the product conduit 157 to the auxiliary device 212. For example, all or a portion of the hydrogen may be provided to either the auxiliary device 212 or the mixer 207, or the hydrogen may be alternately provided to the mixer 207 and the auxiliary device 212.

The blower or compressor 205 and the optional selector valve 210 may be operated by a computer or an operator to controllably vary the gas flow based on one or more of the following conditions: i) detected or observed conditions of the system 200 (i.e., changes in the system operating conditions requiring a change in the amount of hydrogen in the fuel inlet stream); ii) previous calculations provided into the computer or conditions known to the operator which require a temporal adjustment of the hydrogen in the fuel inlet stream; iii) desired future changes, presently occurring changes or recent past changes in the operating parameters of the stack 101, such as changes in the electricity demand by the users of electricity generated by the stack, changes in price for electricity or hydrocarbon fuel compared to the price of hydrogen, etc., and/or iv) changes in the demand for hydrogen by the hydrogen user, such as the hydrogen using device, changes in price of hydrogen or hydrocarbon fuel compared to the price of electricity, etc.

It is believed that by recycling at least a portion of the hydrogen separated from the fuel exhaust (i.e., tail) gas into the fuel inlet conduit 111, a high efficiency operation of the fuel cell system is obtained. Furthermore, the overall fuel utilization is increased. The electrical efficiency (i.e., AC electrical efficiency) can range between about 50% and about 60%, such as between about 54% and about 60% for the methods of the first and second embodiments when the per pass fuel utilization rate is about 75% (i.e., about 75% of the fuel is utilized during each pass through the stack). An effective fuel utilization of about 94% to about 95% is obtained when the per pass utilization is about 75%, and about 85% of the fuel exhaust gas hydrogen is recycled back to the fuel cell stack by the separator 150. Even higher efficiency may be obtained by increasing the per pass fuel utilization rate above 75%, such as about 76-80%. At steady-state, the methods of the first and second embodiments eliminate the need for generating steam when steam methane reformation is used to create the feed gas to the fuel cell. The fuel exhaust stream contains enough water vapor to humidify the fuel inlet stream to the stack at steam to carbon ratios of 2 to 2.5. The increase in net fuel utilization and the removal of heat requirement to generate steam increases the overall electrical efficiency. In contrast, without recycling hydrogen, the AC electrical efficiency is about 45% for a fuel utilization rate within the stack of about 75% to 80%.

Figure 3:
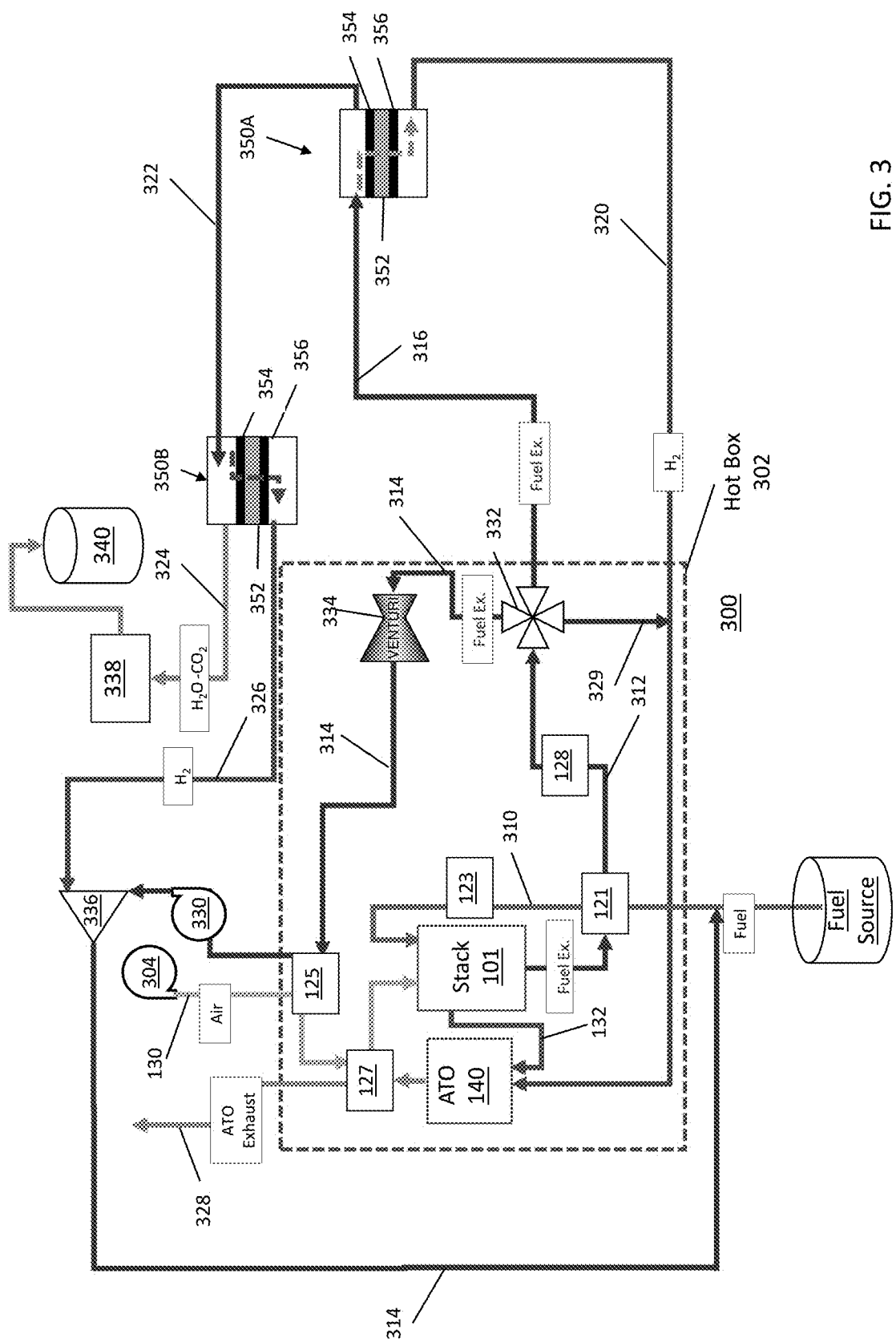

FIG. 3 is a schematic showing a fuel cell system 300, according to various embodiments of the present disclosure. Elements in FIG. 3 having the same numbers as those described above with respect to FIGS. 1 and 2 will not be described again with respect to FIG. 3. The system 300 may include a hotbox 302 containing the fuel cell stack (e.g., SOFC stack) 101, the ATO 140, the fuel heat exchanger 121, the air preheater heat exchanger 125, the air heat exchanger 127, an air inlet blower 304, an anode recycle blower 330, and a splitter 332, which may be operatively connected to the fuel exhaust conduit 312. The system 300 may also include first and second hydrogen pump separators 350A, 350B. In some embodiments, the system 300 may include a Venturi device 334 which may be operatively connected to the recycling conduit 314 (i.e., the anode exhaust recycling conduit). In some embodiments, the system 300 may also include a mixer 336.

The system 300 may include additional system components, such as a fuel reformer 123, conduits (e.g., 130, 132), etc., as described above with respect to the systems 100 and 200 of FIGS. 1 and 2.

The pump separators 350A, 350B, which may be any suitable type of electrochemical hydrogen separator, such as the electrochemical hydrogen pump separators 150 described above. For example, the pump separators 350A, 350B may each comprise a proton conductor electrolyte 352 disposed between an anode 354 and a cathode 356. A hydrogen-containing gas stream, such as the fuel cell fuel exhaust stream is fed to the anode, where the hydrogen is dissociated by a catalyst material of the anode into protons and electrons. Electrons are driven to the cathode by means of an applied voltage, driving protons to the cathode and evolving pure hydrogen gas.

For example, suitable electrolyte materials include any suitable proton conductors, such as proton exchange membrane (PEM) or polymer electrolyte membranes such as sulfonated tetrafluoroethylene based fluoropolymer-copolymer having a chemical formula: $C_7HF_{13}O_5S.C_2F_4$ sold under the brand name Nafion®, phosphoric acid membranes described in the prior embodiments (including PBI-based phosphoric acid membranes comprising poly-phosphoric acid and polybenzomidazole polymer), proton conducting oxides include phosphates such as $LaPO_4$, solid acids (such as cesium dihydrogen phosphate, $CsH_2PO_4$), and certain perovskite ($ABO_3$) materials such as perovskite type cerates, niobates, phosphates, gallates or zirconates, such as BaCeYO (BCO), BaZrYO (BZO), LaSrPO, BaCaNbO (BCN), LaCaNbO, or LaBaGaO (LBGO) those described in Chem. Soc. Rev., 2010, 39, 4370-4387, incorporated herein by reference in its entirety.

The blower 330 may be any suitable fluid (e.g., gas) blower, pump, compressor, or the like. The splitter 332 may be, for example, a computer or operator controlled multi-way valve, such as a four-way valve, or any other suitable fluid splitting device, such as a passive splitter containing openings or slits in a fluid conduit.

A fuel inlet conduit 310 may be configured to fluidly connect the stack 101 to a hydrocarbon fuel source, such as a natural gas source, a propane source, or the like (e.g., natural gas line or propane tank). The fuel inlet conduit 310 may also be fluidly connected to other system components, such as a CPOx reactor, fuel heat exchanger 121, reformer 123, etc. A fuel exhaust conduit 312 may be configured to fluidly connect an anode exhaust outlet of the stack 101 to the splitter 332. A recycling conduit 314 may be configured to fluidly connect an outlet of the splitter 332 to an inlet of the fuel cell stack 101 through the mixer 336. A first separation conduit 316 may be configured to fluidly connect an outlet of the splitter 332 to an inlet of the first pump separator 350A. The mixer 336 and Venturi device 334 may be operatively connected to the recycling conduit 314.

An ATO inlet conduit 320 may be configured to fluidly connect a cathode outlet of the first pump separator 350A to an inlet of the ATO 140. A second separation conduit 322 may be configured to fluidly connect an anode outlet of the first separator 350A to an inlet of the second pump separator 350B. A byproduct conduit 324 may fluidly connect an anode outlet of the second pump separator 350B to an optional $CO_2$ storage system or device 340. A hydrogen conduit 326 may fluidly connect a cathode outlet of the second pump separator 350B to an inlet of the mixer 336. An exhaust conduit 328 may be fluidly connected to an outlet of the ATO. An optional start-up conduit 329 may connect the splitter 332 to the ATO inlet conduit 320. If the splitter 332 is a four way valve, then the valve is open between the fuel exhaust conduit 312 and the start-up conduit 329 during the start-up mode of the system 300 to provide fuel to the ATO 140 through conduits 312, 329 and 320. The valve is closed between the fuel exhaust conduit 312 and the start-up conduit 329 during the steady-state mode of the system 300 because the hydrogen pump separator 350A provides fuel to the ATO 140 through the ATO inlet conduit 320.

The Venturi device 334 may be configured to change the speed of a fluid flowing there through. The Venturi device 334 may be used to measure the anode recycle stream flow in the recycling conduit. The hydrogen flow in the hydrogen conduit 326 from the hydrogen pump separator 350B may be calculated from the current applied to the hydrogen pump separator 350B. The total flow of stream 326 can be calculated if the water transport in the hydrogen pump can be characterized. Thus, the flow rates of the hydrogen and anode recycle streams provided to the mixer 336 may be determined as discussed above. The mixer 336 may be any suitable device configured to combine two fluid streams into a single fluid stream. In one embodiment, the mixer 336 may be located outside the hot box 302 downstream of the blower 330 to mix the hydrogen stream from the hydrogen conduit 326 with the fuel recycle stream from the recycle conduit 314.

The system 300 may include an optional WGS reactor 128 operatively connected to the fuel exhaust conduit 312. The WGS reactor 128 may be configured to convert CO and $H_2O$ in the fuel exhaust into $CO_2$ and $H_2$. The WGS reactor 128 may be disposed between the fuel heat exchanger 121 and the splitter 332. In some embodiments, the WGS reactor 128 may be located internally in the hot box 302, in-situ inside the first pump separator 350A, or on the anode exhaust conduit anywhere between the stack 101 and the first pump separator 350A. In one embodiment, a high temperature water-gas shift catalyst may be located in the fuel heat exchanger 121 inside the hot box 302, and a medium or low temperature water-gas shift catalyst may be located in the recycle conduit 316. Thus, in this embodiment, a first part of the WGS reactor 128 is integrated into the fuel heat exchanger 121, while a second part of the WGS reactor 128 is integrated into the recycle conduit 316.

In operation, fuel exhaust output from the stack 101 may be pumped through the fuel exhaust conduit 312 by the blower 330 and provided to the splitter 332. The splitter 332 may be configured to actively or passively provide a first portion of the fuel exhaust (e.g., a first fuel exhaust stream) to the recycling conduit 314 and to selectively provide a second portion of the fuel exhaust (e.g., a second fuel exhaust stream) to the first separation conduit 316.

The recycling conduit 314 may be configured to provide the first fuel exhaust stream output from the splitter 332 to the fuel cell stack 101 through the mixer 336. The Venturi device 334 may operate as a measurement device to measure pressure drop to detect the flow rate of the first fuel exhaust stream in the recycling conduit 314 or as a throttle to decrease the flow rate.

The first separation conduit 316 may be configured to provide the second exhaust stream received from the splitter 332 to an inlet of the first pump separator 350A. The first pump separator 350A may preferentially separate hydrogen gas from the fuel exhaust. As such, the pump separator 350A may output hydrogen (e.g., an ATO fuel stream) to the ATO 140 via the ATO inlet conduit 320. The first pump separator 350A may operate in constant current mode. This may help to control the flow of hydrogen to the ATO 140. The stack 101 cathode exhaust may also be provided to the ATO 140. The ATO exhaust (i.e., oxidized anode exhaust and cathode exhaust) will be totally or substantially $CO_2$ free (e.g., other than any $CO_2$ present in the air which comprises the cathode exhaust), since the ATO fuel is comprised of hydrogen.

Since the hydrogen demands of the ATO may be less than a hydrogen output of the stack 101, the first pump separator 350A may be configured to remove only a portion of the hydrogen from the second fuel exhaust stream. As such, a remainder of the second fuel exhaust steam may contain hydrogen and may be output from the anode outlet of the first pump separator 350A and provided to the inlet of the second pump separator 350B by the second separation conduit 322. If ATO fuel is not required to maintain the thermal balance within the hot box (e.g. later in life of the system 300), then the recycle conduit 316 may be configured to bypass the first hydrogen pump separator 350A, or it may pass through the first hydrogen pump separator without any current applied to the first hydrogen pump separator 350, thus making the flow of hydrogen in the ATO inlet conduit 320 zero. In this embodiment, external fuel may be provided to the ATO 140 instead, as will be discussed with respect to FIG. 7 below.

The second pump separator 350B may be configured to separate hydrogen from the second fuel exhaust stream and thereby generate a hydrogen stream and a byproduct stream comprising primarily of gaseous water and carbon dioxide.

In one aspect, the first pump separator 350A may be operated in a constant current mode to control fuel flow to ATO 140, while the second pump separator 350B may operate in a constant voltage mode and recycle the hydrogen back to the stack 101, as part of the anode recycle stream. The first and second pumps 350A, 350B may be based on either high temperature membrane (about 160° C.) or low temperature membrane (about 80° C.) chemistries, or a combination of the two, depending on the performance and operating conditions.

In some embodiments, the system 300 may optionally include a carbon dioxide processing device 338 and a carbon dioxide storage device 340, which may be operatively connected to a byproduct conduit 324 that is fluidly connected to an anode outlet of the second pump separator 350B. The processing device 338 may operate to compress and/or cool a carbon dioxide stream received from the second pump separator 350B. The optional carbon dioxide processing device 338 may be a condenser and/or dryer configured to remove water from the carbon dioxide byproduct stream. The product carbon dioxide stream provided to the storage device 340 may be in the form of vapor, liquid, solid or supercritical carbon dioxide.

The remaining purified or pure $CO_2$ may be stored/sequestered in a storage device 340, or used for chemical processes, beverage carbonation, etc. In some embodiments, the storage device 340 may be a cryogenic storage device configured to convert the $CO_2$ into dry ice for storage.

A hydrogen stream may be output from the cathode outlet of the second pump separator 350B to the mixer 336, by the hydrogen conduit 326. The hydrogen may be mixed in the mixer 336 with the first fuel exhaust stream provided by the recycling conduit 314, to form an anode recycle stream. Some or all of the hydrogen stream in the hydrogen conduit 326 may also be removed as a hydrogen product rather than being recycled into the recycle conduit 314. In this embodiment, the mixer 336 may be omitted. The removed hydrogen product may be compressed, dried and stored.

The anode recycle stream may be provided from the mixer 336 to the fuel cell stack 101 or fuel inlet conduit 310, where it may be mixed with incoming fuel provided from the fuel source, before being recycled back to the stack 101. In some embodiments, the flow rate of the first fuel exhaust stream may be controlled such that a O:C ratio (oxygen:carbon ratio) of the fuel provided to the stack 101 provides for sufficient oxygen content to suppress coking at any temperature within the hot box.

The hydrogen stream may contain at least 95% $H_2$, such as from about 95% to about 100% $H_2$ on a dry basis. In other words, by using both the first and second pump separators 350A, 350B in tandem, the system may produce highly purified hydrogen gas from the fuel exhaust generated by the stack 101. Accordingly, the system 300 may be configured to remove over 95% of carbon dioxide ($CO_2$), such as 95 to 100% of $CO_2$ output from the fuel cell stack 101 anode exhaust using the two pump separators 350A, 350B.

In addition, the ATO exhaust (i.e., oxidized anode exhaust and cathode exhaust) may be totally or substantially $CO_2$ free (e.g., other than any $CO_2$ present in the air which comprises the cathode exhaust), since the ATO 140 is provided with $H_2$ as fuel.

Carbon monoxide (CO) buildup and/or water blockages may occur in hydrogen pump separators, such as the pump separators 350A, 350B, which may reduce separation efficiency. As such, in some embodiments, an AC impedance (e.g., as described in U.S. Pat. No. 9,461,320, incorporated by reference in its entirety) may be used to detect CO buildup and/or water blockages using a voltage ripple from DC/DC power supplies connected to the pump separators 350A, 350B, at any suitable frequencies. For example, a frequency of 1 Hz may to detect liquid water flooding, while a frequency of 1 kHz, may be used to detect CO buildup. The ripple from one separator may cancel the ripple from the other separator, or where in the ripple is canceled by other ripples in the integrated fuel cell system. The AC impedance signal may be used to trigger systems responses to resolve the issue such as increasing pumping potential, if CO is detected, or purging the anodes or cathodes of the pump separators 350A, 350B. For example, if a water blockage is detected, then the purging may include increasing the inlet pressure or decreasing the outlet pressure to a separator, or increasing the separator operating temperature.

In some embodiments, the pump separators 350A, 350B may include a carbon microlayer as part of a gas diffusion layer of the anodes 354. However, it has been determined that carbon microlayers may become oxidized during separator operation. Accordingly, in some embodiments, the anodes 354 may include a bilayer electrode structure including a Teflon (polytetrafluoroethylene) bonded first electrode facing an incoming fuel stream, and an ionomer bonded electrode second electrode facing the electrolyte 352, which may be proton exchange membrane.

In an electrochemical pump, a carbon support for the electrode structure which may lead to peroxide generation which degrades the electrolyte. In one embodiment, high surface area catalyst, such as Pt or Pt—Ru may be used as an electrode without a carbon support in the pump separators 350A, 350B. In another embodiment, a conductive or semi-conductive metal oxide catalyst, such as titanium oxide or iridium oxide, may be used as an electrode in the pump separators 350A, 350 to reduce peroxide generation.

It has also been determined that CO levels of above 100 ppm may affect pump separator performance and reliability. As such, a WGS catalyst, including but not limited to $Cu/ZnO/Al_2O_3$ catalysts, may be included as part of the anode gas diffusion layer and/or anode flow field plate of the pump separators 350A, 350B.

In some instances, an integrated WGS catalyst may not sufficiently mitigate CO poisoning of pump separators operated at low temperatures. Therefore, in some embodiments, an air bleed conduit may be incorporated into the pump separators 350A, 350B, in order to internally oxidize CO to form carbon dioxide. In this configuration, a preferential oxidizer catalyst such as $Au/FeO_x$—$TiO_2$ may be included as part of the anode manifold, anode plate, and/or anode gas diffusion layer of the pump separators 350A, 350B.

In various embodiments and as illustrated in FIGS. 4, 5A, 6 and 7, fuel utilization in a fuel cell stack using only hydrogen as fuel can be increased to above 95%, e.g., near 100% such as 96 to 99.9% by eliminating the fuel flow from the anode exhaust to the ATO during steady state (e.g., eliminating or closing the ATO-inlet conduit shown in FIG. 3), condensing water out of the $H_2/H_2O$ mixture in the anode exhaust, and returning the uncondensed $H_2$ back to the fuel inlet stream provided to the fuel cell stack 101. For example, the separator exhaust conduit 159 shown in FIGS. 1 and 2 or ATO inlet conduit 320 shown in FIG. 3 may be used only during system start up and then closed with a valve during steady state operation of the system once the system reaches an operating temperature above 700° C.

Overall fuel utilization may be increased to essentially 100% by blocking off the flow path (e.g., by eliminating or closing off a respective conduit 159) from the stack 101 anode exhaust to the ATO 140. All stack anode exhaust leaves the hot box, where water is condensed and removed (down to the dew point of water in the heat exchanger, for example 40-80° C., which may depend on ambient temperature). Per pass fuel utilization is now a degree of freedom, and could easily be 50 to about 70% per pass.

Since the hydrogen fuel does not require water to prevent coking, the only water in the fuel would come from the residual water in the recycled $H_2$. This could be limited to 12% or less, potentially bringing the mixed $H_2$ humidity down to 4-6%. At this low humidity/high $H_2$ concentration, the cell voltage at current would be much higher. System efficiency may be about 55 to 60% LHV.

The system cost may also be reduced because many components used for natural gas fueled systems (e.g., such as the systems described in U.S. Pat. Nos. 9,287,572 and 9,190,673, incorporated herein by reference in their entirety) are not required to run the stack on hydrogen: desulfurizer tanks and catalyst, valves used to change the desulfurizer tanks, a CPOx reactor and CPOx air blower, water-related components including a steam generator, heaters to prevent water from freezing, and other miscellaneous water system components, and an inner cylinder to hold the partial reformer and its catalyst. Furthermore, a mass flow controller valve may be replaced with a proportional solenoid valve, since exact control for fuel utilization is no longer required. In addition, the system may include a reduced-sized ATO catalyst, a reduced-sized or omitted cathode recuperator heat exchanger 127 heat shield, and insulation between the ATO 140 and anode recuperator heat exchanger 121 may be eliminated. If the power electronics cannot withstand the open circuit voltage of dry hydrogen, then water may be fed to the system to close the contactors to the power electronics equipment.

Effective system efficiency may also be increased by using the cathode exhaust and/or the anode exhaust for heat integration with an external heat demand (combined heat and power (CHP)).

Figure 4:
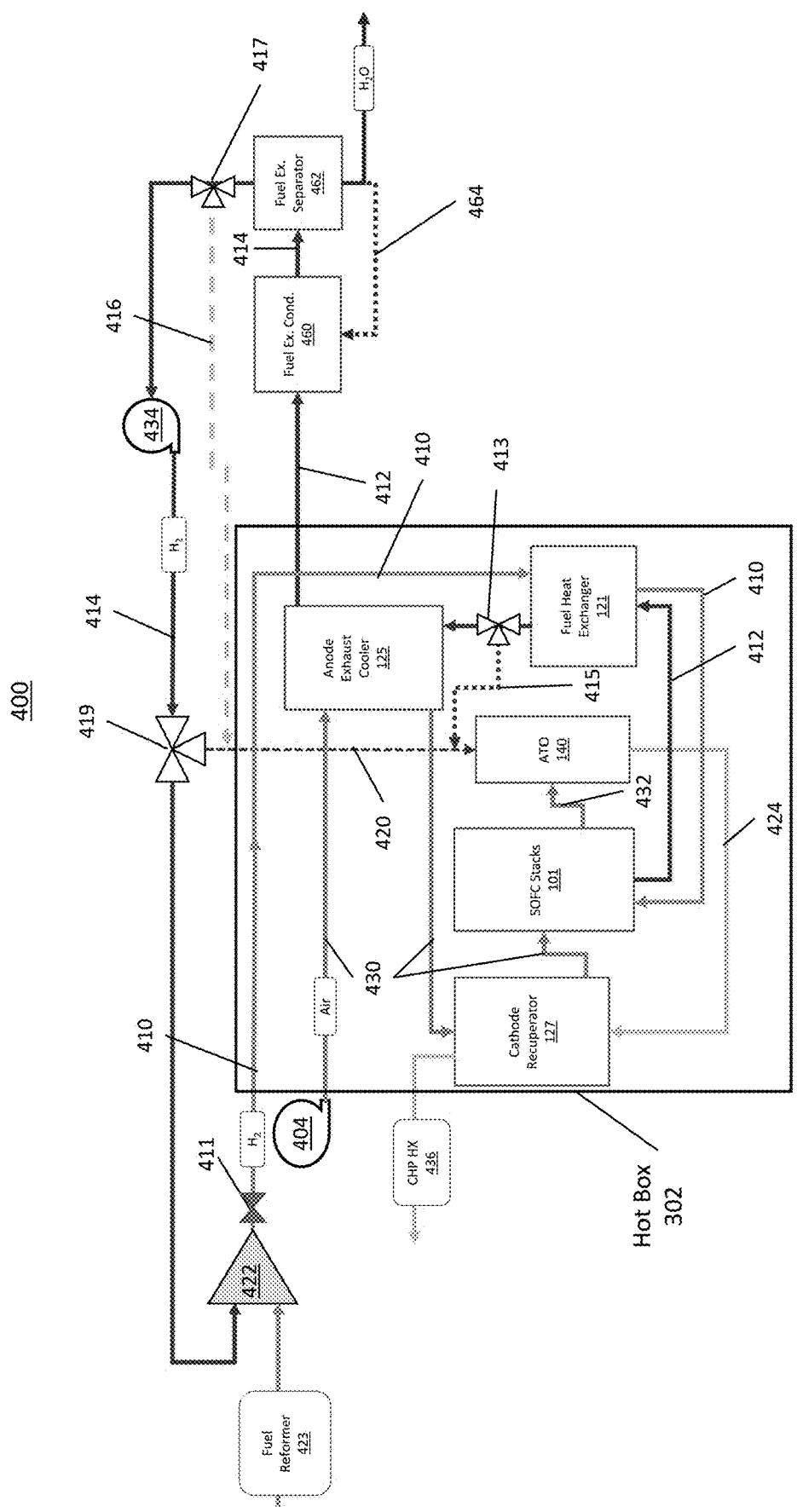

FIG. 4 is a schematic view of a fuel cell system 400 that utilizes hydrogen fuel and operates at greater than 95% (e.g., close to 100%) fuel utilization. The system may include components similar to those included in the systems 100, 200, and 300. Accordingly, previously described components are identified with the same reference numbers and only the differences therebetween will be discussed in detail.

Referring to FIG. 4, the system 400 may include a hotbox 302, one or more fuel cell stacks (e.g., SOFC stacks) 101, a fuel heat exchanger 121 (e.g., anode recuperator), an optional air preheater heat exchanger 125 (e.g., anode exhaust cooler), the ATO 140, an air heat exchanger (e.g., cathode recuperator) 127, an air blower 404, a fuel control valve 411, a bypass valve 413, a bleed valve 417, and a recycling valve 419.

The system 400 may also include a fuel inlet conduit 410 configured to provide $H_2$ to the stack 101 from an external $H_2$ source, a fuel exhaust conduit 412 configured to receive fuel exhaust output from the stack 101, an air inlet conduit 430 configured to provide air from the air blower 404 to the stack 101, and an air exhaust conduit 432 configured to provide air exhaust output from the stack 101 to the ATO 140. The system 400 may include an ATO exhaust conduit 424 that fluidly connects the ATO 140 to the cathode recuperator 127.

In some embodiments, an optional external fuel reformer 423 may be operatively connected to the fuel inlet conduit 410 and configured to generate hydrogen gas provided to the fuel inlet conduit 410. The fuel reformer 423 may be configured to generate hydrogen using a hydrocarbon fuel (e.g., natural gas) received from an external fuel source. Alternatively, pure hydrogen from a hydrogen storage vessel or another hydrogen source may be used as fuel. The reformate may be processed to separate the hydrogen as a pure product from the other species (not shown).

The fuel heat exchanger 121 may be operatively connected to the fuel inlet conduit 410 and the fuel exhaust conduit 412, and may be configured to transfer heat from the fuel exhaust in the fuel exhaust conduit 412 to the $H_2$ fuel in the fuel inlet conduit 410. Cooled fuel exhaust output from the fuel heat exchanger 121 may be provided to the anode exhaust cooler 125. The anode exhaust cooler 125 may be configured to transfer heat from the fuel exhaust to air in the air inlet conduit 430. In some embodiments, the anode exhaust cooler 125 may be omitted, such as if the fuel exhaust is used to provide combined heat and power.

A bypass conduit 415 may fluidly connect the exhaust conduit 412 to the ATO 140. The bypass conduit 415 may be connected to the exhaust conduit 412 between the fuel heat exchanger 121 and the anode exhaust cooler 125. The bypass valve 413 may be operatively connected to the fuel exhaust conduit 412. The bypass valve 413 may be an automatic or manually controlled valve configured to selectively divert at least a portion of the fuel exhaust to the ATO 140, via the bypass conduit 415. The bypass valve to directly feed the ATO may be located inside the hot box 302 as shown or outside the hotbox 302.

The fuel exhaust may be output from the anode exhaust cooler 125 in the hotbox 302 to an external fuel exhaust condenser 460, via the fuel exhaust conduit 412. The fuel exhaust condenser 460 may be an air-cooled or water-enhanced, air-cooled condenser and/or heat exchanger configured to cool the fuel exhaust to a temperature sufficient to condense water vapor in the fuel exhaust and/or protect the anode recycle blower 434 from heat damage. For example, the fuel exhaust condenser 460 may be configured to reduce the water content of the fuel exhaust to about 12% or less, when the fuel exhaust condenser 460 operates at about 50° C. and about 1 atm. In some embodiments, the fuel exhaust condenser 460 may be cooled using water recycled through an external cooling tower. In some embodiments, a portion of the fuel exhaust condenser 460 may be utilized as part of a combined heat and power system. For example, water heated by the fuel exhaust condenser 460 may be utilized as an external hot water source or facility heat source.

The system 400 may include a recycling conduit 414 that fluidly connects the fuel exhaust condenser 460 to the fuel inlet conduit 410. For example, the recycling conduit 414 and the fuel inlet conduit 410 may be fluidly connected to a mixer 422 configured to mix the hydrogen fuel received from the fuel reformer 423 or another hydrogen source with the fuel exhaust. A fuel exhaust separator 462 (e.g., dryer or knockout pot), bleed valve 417, the recycling valve 419, and a anode recycle blower 434 may be operatively connected to the recycling conduit 414.

The fuel exhaust stream may be output from the fuel exhaust condenser 460 to the separator 462, via the recycling conduit 414. The separator 462 may be configured to separate liquid water from the fuel exhaust. In some embodiments, the liquid water may be optionally returned to the fuel exhaust condenser 460, via a water conduit 464 that fluidly connects the separator 462 to the fuel exhaust condenser 460 and/or to an external water cooling system, such as a cooling tower or the like. The fuel exhaust condenser 460 may also include refrigerated stages or solid water adsorbing species to further depress the dew point of the stream in the recycling conduit 414.

An ATO inlet conduit 420 may fluidly connect the recycling valve 419 to the ATO 140. A bleed conduit 416 may fluidly connect the recycling conduit 414 to the ATO inlet conduit 420. The bleed valve 417 may be operatively connected to the bleed conduit 416 and the recycling conduit 414.

The bleed valve 417 may be an automatic or manually controlled valve configured to purge impurities from the fuel exhaust. In some embodiments, the bleed valve 417 may be fluidly connected to the stack 101 and may be configured to provide back pressure to the fuel cells of the stack 101, in order to equalize anode and cathode pressures.

The recycling valve 419 may be a manually or automatically controlled three-way valve configured to selectively direct all or portions of the fuel exhaust into the ATO inlet conduit 420 or into the fuel inlet conduit 410 via the mixer 422. For example, the recycling valve 419 may be configured to direct the fuel exhaust to the ATO 140 during startup of the system 400, but may direct all or substantially all of the fuel exhaust to the fuel inlet conduit 410 during steady-state operation of the system 400 (e.g., after the system 400 reaches the steady-state operating temperature above 700° C.). The fuel exhaust may be returned to the fuel inlet conduit 410, upstream of the fuel control valve 411, which may be configured to control fuel flow through the fuel inlet conduit 410. In some embodiments, the fuel control valve may be a proportional solenoid valve rather than a conventional mass flow control valve, since the precision flow control provided by a mass flow control valve may not be necessary for achieving a high rate of fuel utilization in a system that operates using hydrogen gas as a fuel.

The air blower 404, anode exhaust cooler 125, and cathode recuperator 127 may be operatively connected to the air inlet conduit 430. The cathode recuperator 127 may also be operatively connected to the ATO exhaust conduit 424. The air blower 404 may be configured to force air or an oxidant gas through the air inlet conduit 430 to the stack 101. The air stream in the air inlet conduit 430 may be heated by the fuel exhaust output from the anode exhaust cooler 125, and may be additionally heated using ATO exhaust (e.g., combustion exhaust) output from the ATO 140. The air inlet stream may also be heated in the cathode recuperator 127 using cathode exhaust output from the stacks 101 to the ATO 140, via the cathode exhaust conduit 432, when the ATO is not operating (e.g., during steady-state operation of the system 400). Cathode and/or ATO exhaust may be vented from the cathode recuperator 127 to the atmosphere, or may be provided to an optional external combined heat and power (CHP) heat exchanger 436 fluidly connected to the ATO exhaust conduit 424.

As discussed above, fuel flow to the ATO 140 is provided during startup but may not be provided during steady state. The fuel exhaust condenser 460 may provide for easy separation of $H_2$ for recycle from water produced in cells. The anode recycle blower 434 has a lower chance of overheating due to the removal of water from the fuel exhaust stream. In some embodiments, water from the separator 462 may also be provided to the CHP heat exchanger 436. In other embodiments, water from the separator 462 may be provided to the fuel reformer 423, which may be a WGS reactor. In some embodiments, the separator 462 may be omitted and water may be output directly from the fuel exhaust condenser 460. In one embodiment, the separator is a knockout pot which provides space for the liquid water to disengage from the vapor stream.

Various embodiments also provide method for $CO_2$ sequestration. Natural gas may be fed to an onsite reformer to generate hydrogen fuel, while $CO_2$ may be sequestered from the reformation process. A similar configuration may be used for systems running on natural gas fuel. In the natural gas case, the air cooled condenser for the hydrogen fuel embodiment may be replaced with a cryogenic, membrane based, PSA, TSA, or any other existing commercial process capable of doing the separation designed to separate anode exhaust into three separate streams which include: $CO_2$ as shippable liquid or dry ice for offsite $CO_2$ use or sequestration (or as a high pressure gas/supercritical gas for shipping in cylinders or a pipeline); a liquid water product; a gaseous mixture of $H_2$ and CO. A majority of the mixture may be recycled as fuel to be mixed with natural gas feed (post MFC valve) if introduced to each hot box, or at the site level to be mixed with the natural gas at the site level (pre MFC valve), and a small portion of the mixture may be fed directly to the ATO to maintain thermal balance for the hot box (if necessary, this may drop to zero later in life of the system)

Any suitable cryogenic plant technology may be used. Alternatively, the cryogenic separation may be replaced by a single or multistage hydrogen pump (e.g., PEM or PBI type described above). The use of the hydrogen pump would produce a gaseous mixture of $CO_2$ and $H_2O$ potentially with traces of CO and $H_2$, followed by further processing to produce a liquid $CO_2$ product for shipping or use.

FIG. 5A is a schematic view of a fuel cell system 500, according to various embodiments of the present disclosure, and FIG. 5B is a schematic view components of a possible gas separator of FIG. 5A. The system 500 is similar to the system 400. As such, only the differences therebetween will be discussed in detail. Although not shown, the system 500 may include additional components, such as components shown in the systems of FIGS. 1-3. The system 500 may operate on hydrogen or hydrocarbon fuel.

Referring to FIG. 5A, the system 500 may include an internal fuel reformer 123 disposed within the hotbox 302. The system 500 may also include a Venturi device 334, anode recycle blower 434, a gas separator 570, and a fuel exhaust splitter 558.

The splitter 558 may be fluidly connected to the fuel exhaust conduit 412, the recycling conduit 414, and a fuel exhaust processing conduit 516. The splitter 558 may be a manually or automatically controlled three-way valve configured to selectively control the flow of fuel exhaust through the recycling conduit 414 and the processing conduit 516. Alternatively, the splitter 558 may be a passive splitter.

The anode recycle blower 434, Venturi device 334, and fuel exhaust splitter 558 may be operatively connected to the recycling conduit 414. The system may optionally include an external anode exhaust cooler 560, in addition to or in place of the anode exhaust cooler 125 disposed in the hotbox 302. For example, the external anode exhaust cooler 560 may be a heat exchanger and/or a condenser configured to cool the fuel exhaust using external air, water and/or another cooling fluid for CHP. If the external anode exhaust cooler 560 includes or is a condenser, then it may remove water from the fuel exhaust. The anode recycle blower 434 may be configured to force fuel exhaust through the recycling conduit 414 and the Venturi device 334, to the fuel inlet conduit 410.

The gas separator 570 may be configured to separate the fuel exhaust into separate streams of water, carbon dioxide, and a mixture of hydrogen and carbon monoxide. The gas separator 570 may include any suitable type of gas separator, such as a cryogenic separator, a pressure swing adsorption separator, a membrane separator, an amine scrubbing separator, a selexol separator, or any combination thereof. The water stream may be sufficiently pure to be utilized as cooling water for the anode exhaust cooler 560. There may be only one gas separator 570 for many hot boxes 302, one gas separator 570 for each hot box 302.

Referring to FIG. 5B, the gas separator 570 may include a heat exchanger 572, a main compressor 574, a water separator 576, a $CO_2$ condenser 578, and a distillation column 580. The heat exchanger 572 may be configured to reduce the temperature of the fuel exhaust.

The main compressor 574 may be configured to compress the cooled fuel exhaust and thereby generate a second water stream. The fuel exhaust may then be provided to a water separator 576 or drier configured to remove residual water from the fuel exhaust. The water separator 576 may include a regeneratable water absorbent, for example, which adsorbs water via temperature swing adsorption or another suitable method.

The dried fuel exhaust may then be provided to the $CO_2$ condenser 578, which may be configured to cool the fuel exhaust to a temperature sufficient to generate liquid $CO_2$. For example, the condenser 578 may be configured to cool the fuel exhaust to a temperature ranging from about −20° C. to about −30° C.

The fuel exhaust, including liquid $CO_2$ and any remaining $CO_2$ gas may then be provided to the distillation column 580. The distillation column 580 may include multiple stages, a condenser, and/or a reboiler. In some embodiments, the distillation column may be configured to chill the fuel exhaust at a temperature ranging from about −50° C. to about −90° C. The distillation column 580 may be configured to output a hydrogen stream and a liquid $CO_2$ stream. The steams may also comprise residual amounts (e.g., about % or less) of CO, $CO_2$ and $N_2$.

In some embodiments, the carbon dioxide stream may be stored as dry ice. In various embodiments, the water may be provided to the CHP heat exchanger 436. The hydrogen and carbon monoxide may be provided to the stack 101 and/or the ATO 140, as will be described in more detail with respect to FIG. 6. In another embodiment, the hydrogen and carbon monoxide may be provided to the water separator 576 to be used as a stripping gas, which removes water absorbed to the adsorbent material in the water separator. The water containing hydrogen and carbon monoxide stream may then be provided to the stack 101 and/or the ATO 140, since water does not hamper their operation.

In some embodiments, the components of the gas separator 570 which require DC electric power may be powered directly by the DC power output from the stacks 101.

Additional heat may be provided to vaporize the water and/or additional external fuel may be provided to the ATO. In some embodiments, a WGS reactor 128 may be operatively connected to the fuel exhaust conduit 412.

The system may include a fuel reformer 123, which may be thermally integrated with the SOFC stack 101 fuel exhaust. $CO_2$ sequestration may be performed upstream of the stack 101. Water for reformation and/or water-gas shift reactions may be provided from the condensed water from the gas separator 570.

Figure 5C:
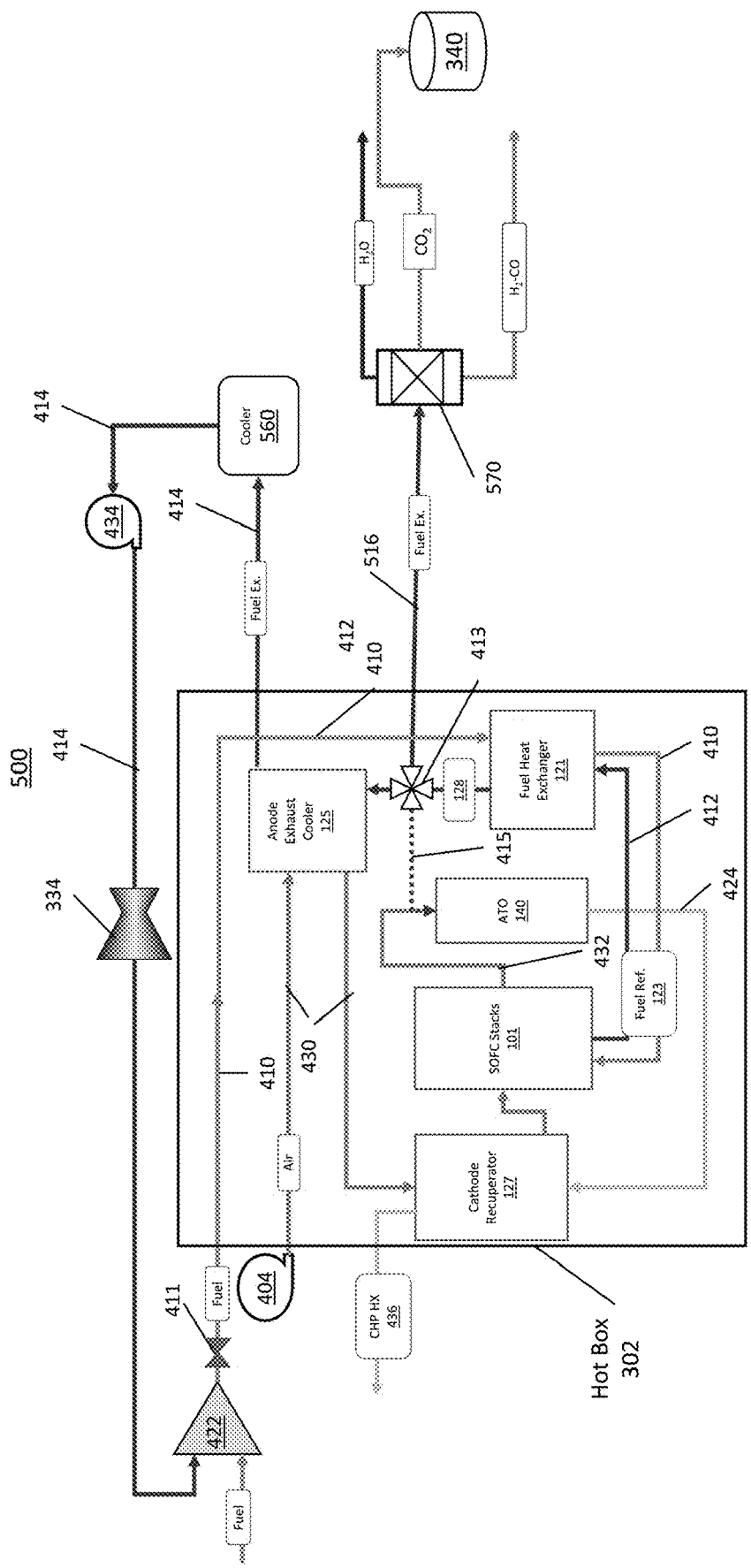

FIG. 5C is a schematic of an alternative embodiment of the fuel cell system 500 shown in FIGS. 5A and 5B. In this alternative embodiment, the fuel exhaust processing conduit 516 is fluidly connected to the splitter 413 upstream from the anode exhaust cooler 125. Thus, a portion of the fuel exhaust is provided to the gas separator 570 directly from the splitter 413 without reaching the anode exhaust cooler 125. In this alternative embodiment, the splitter 558 may be omitted, and the remaining portion of the fuel exhaust is provided directly from the anode exhaust cooler 125 into the external cooler 560.

Figure 6:
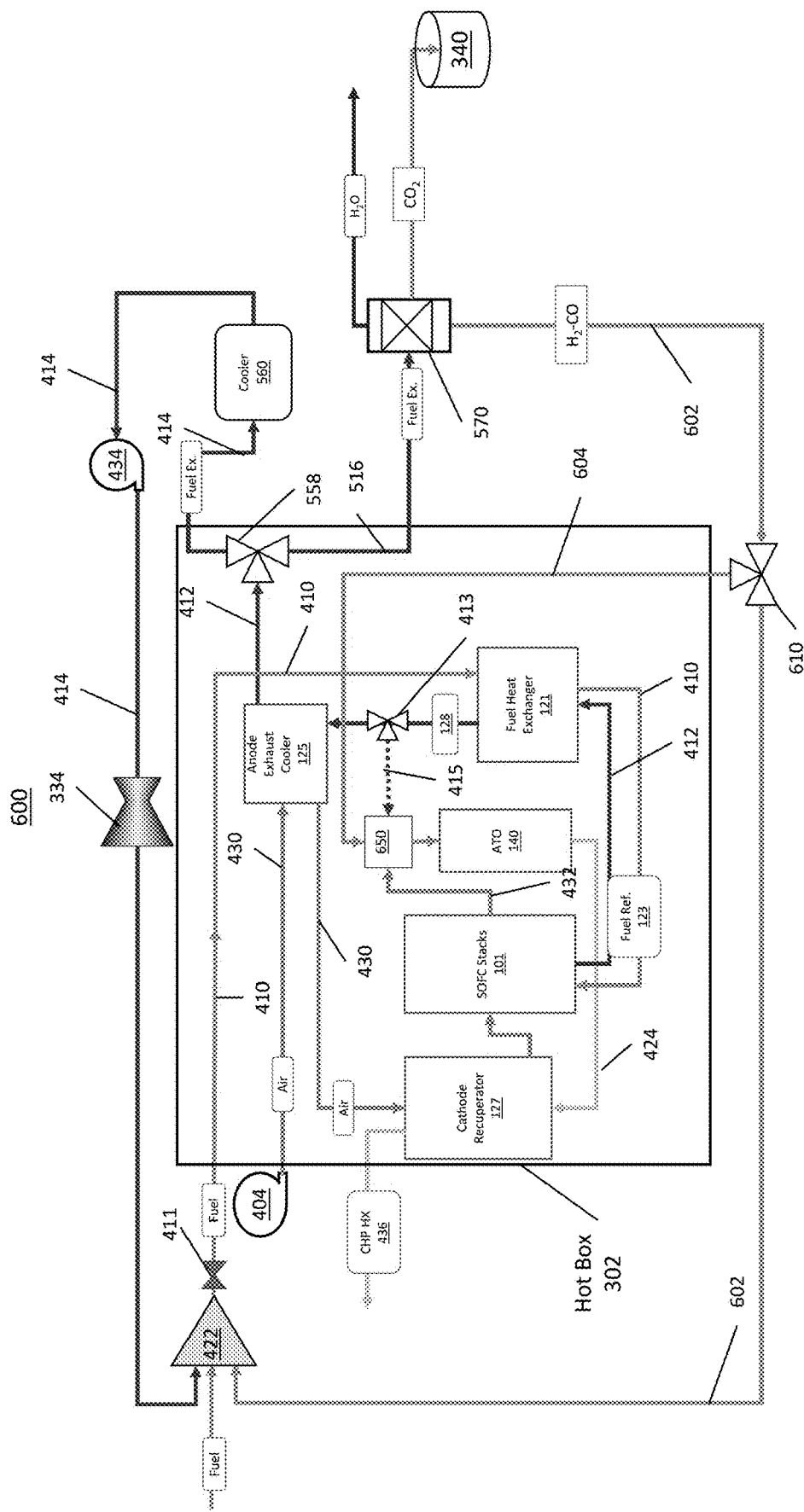

FIG. 6 is a schematic view of a fuel cell system 600, according to various embodiments of the present disclosure. The system 600 is similar to the system 500. As such, only the differences therebetween will be discussed in detail. Although not shown, the system 600 may include additional components, such as components shown in the systems of FIGS. 1-4.

Referring to FIG. 6, the system 600 may include a hydrogen recycling conduit 602, an ATO inlet conduit 604, and a splitter 610. The recycling conduit 602 may be configured to fluidly connect the separator 570 to the fuel inlet conduit 410 and/or mixer 422. The splitter 610 may be operatively connected to the recycling conduit 602. The ATO inlet conduit 604 may fluidly connect an outlet of the splitter 610 to the ATO 140.

In some embodiments, the system 600 may include an ATO mixer 650 fluidly connected to the ATO 140 and conduits 415, 432, and/or 604. The ATO mixer 650 may be configured to mix the air exhaust from conduit 432, with the fuel exhaust from conduit 415, and/or the hydrogen and carbon monoxide mixture from conduit 604. However, in some embodiments the bypass conduit 415 and the bypass valve 413 may be omitted.

A hydrogen stream may be output from the gas separator 570 to the output conduit 602. The hydrogen stream may in some embodiments, include a small amount of carbon monoxide. The splitter 610 may be a manual or automatically controlled three-way valve or a passive splitter configured to selectively divert at least a portion of the hydrogen stream into the ATO inlet conduit 604 from the recycling conduit 602. Accordingly, the splitter 610 may be configured to selectively or non-selectively control hydrogen flow to the ATO 140 and the fuel inlet conduit 410. For example, the splitter 610 may be configured to direct a sufficient amount of the gas mixture to the ATO 140, via the ATO mixer 650, to maintain hot box operating temperatures, during steady-state operation of the system 600. A remainder of the gas mixture may be provided to the fuel mixer 422 and may operate to purge nitrogen gas from the incoming fuel. During system startup, fuel exhaust may be provided to the ATO 140 via conduit 415. Alternatively, conduit 415 may be omitted and the ATO inlet conduit 420 may fluidly connect the recycle conduit 414 via recycling valve 419 to the ATO 140, as shown in FIG. 4. The ATO inlet conduit 420 and the recycling valve 419 may be connected to the recycle conduit 414 upstream or downstream of the blower 434, but upstream of the Venturi device 334.

Furthermore, the remaining hydrogen and carbon monoxide recycle stream is provided through the recycling conduit 602 and the mixer 422 into the fuel inlet conduit 410 to be mixed with the fuel inlet stream (e.g., natural gas, etc.). In one embodiment, the hydrogen and carbon monoxide recycle stream provided through the recycling conduit 602 to the mixer 422 may be at a higher pressure than the fuel inlet stream being provided to the mixer. Since the hydrogen and carbon monoxide recycle stream is provided at a higher pressure than the fuel inlet stream, the hydrogen and carbon monoxide recycle stream is used first in the stack 101, with the fuel inlet stream blending in to fulfill the required total amount of the fuel. By measuring the flow rate of the fuel inlet stream, and the flowrate and composition of the hydrogen and carbon monoxide recycle stream, the overall composition of the blended fuel stream to the site of the system 600 is be calculated, and passed to each power module of the system 600 for control. As discussed above, there may be one or more hot boxes 302 for each gas separator 570.

Figure 7:
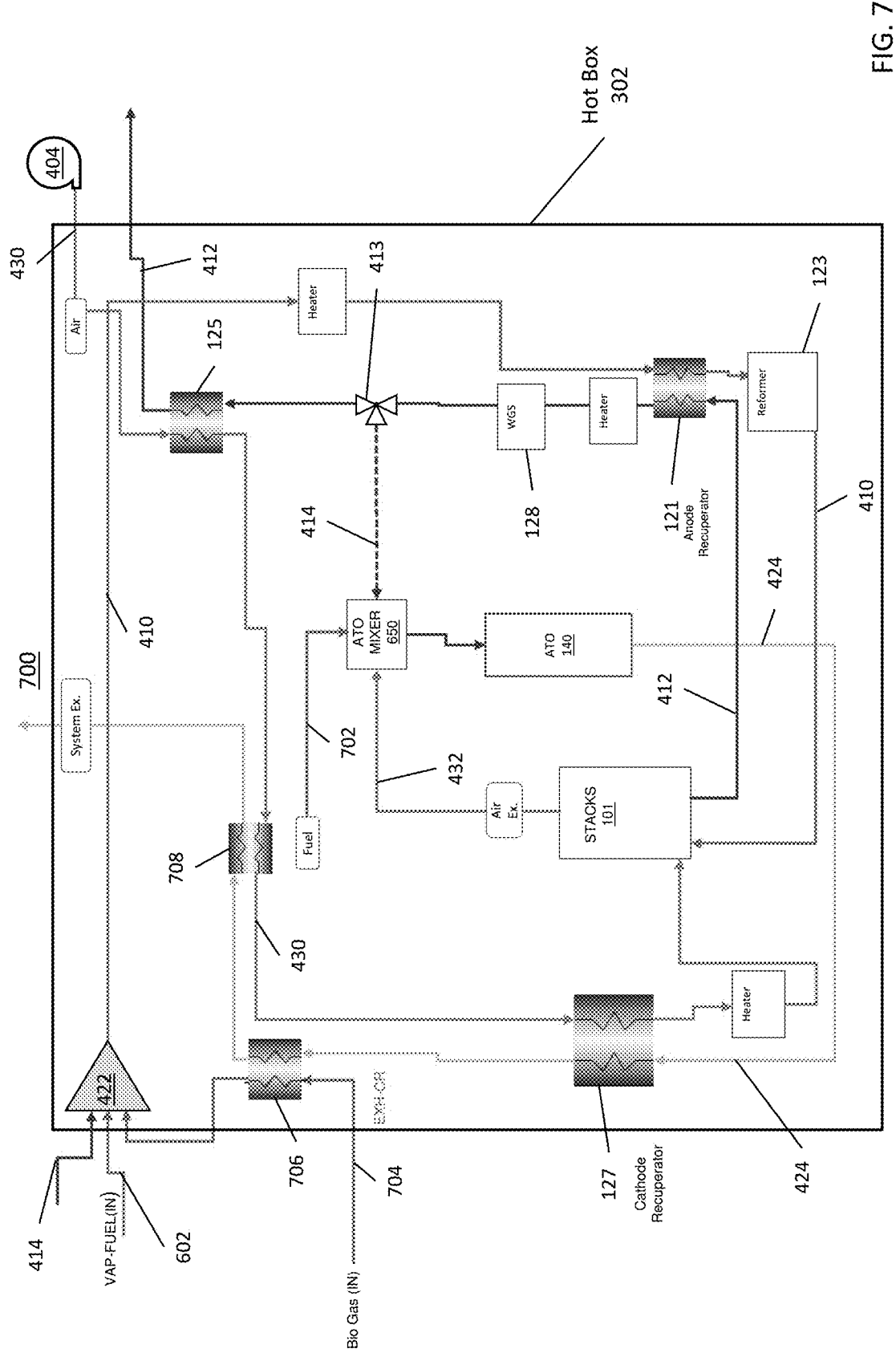

FIG. 7 is a schematic view of a fuel cell system 700, according to various embodiments of the present disclosure. The system 700 is similar to the system 600. As such, only the differences therebetween will be discussed in detail. Although not shown, the system 600 may include additional components, such as fuel processing components shown in FIG. 6 and system components shown in FIGS. 1-5.

Referring to FIG. 7, the system 700 may include a WGS reactor operatively connected to the fuel exhaust conduit 412, between the anode recuperator 121 and the optional anode exhaust cooler 125. The combination of the WGS reactor 128 and the anode exhaust cooler 125 may operate to increase the amount of $CO_2$ that is extractable by the gas separator 570 shown in FIGS. 5A, 5B and 6 for sequestration. The system 700 may also include a fuel reformer 123 that is operatively connected to the fuel inlet conduit, between the fuel heat exchanger 121 and the stack 101.

The system 700 may also include an ATO inlet conduit 702 configured to provide fuel to the ATO mixer 650 from an external fuel source. The system 700 may further include components configured to facilitate operation using biogas. In particular, the system may include a biogas inlet conduit 704 and a biogas preheater heat exchanger 706. The biogas inlet conduit 704 may fluidly connect a biogas source to the mixer 422. The biogas preheater heat exchanger 706 may be configured to heat the biogas in the inlet conduit 704 using the ATO exhaust in the ATO exhaust conduit 424.

The system 700 may also include a stack exhaust heat exchanger 708. The stack exhaust heat exchanger 708 may be configured to preheat the air in the air inlet conduit 430 using the ATO exhaust in the ATO exhaust conduit 424. Accordingly, the stack exhaust heat exchanger 708 may heat the air inlet stream, such that the air inlet stream temperature is increased when entering the cathode recuperator 127. Thus, less heat from the ATO exhaust is needed to heat the air inlet stream in the cathode recuperator, which increases the temperature of the ATO exhaust provided from the cathode recuperator 127 to the heat exchanger 708. As such, the biogas may be heated to a higher temperature by the hotter ATO exhaust in the biogas preheater heat exchanger 706.

In some embodiments, the splitter 413 and conduit 414 may be omitted from the system 700 because the ATO 140 receives fuel from the external fuel source via conduit 702.

Figure 8:
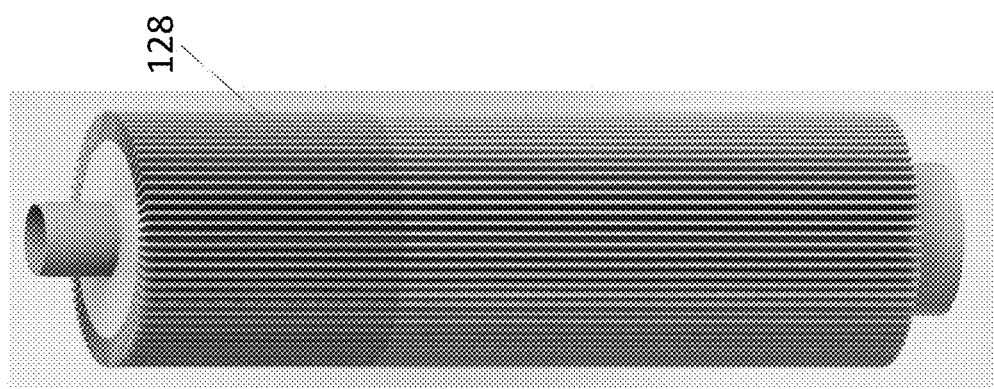
FIG. 8 is a perspective view of a water gas shift reactor, according to various embodiments of the present disclosure.

FIG. 8 illustrates a perspective view of a WGS 128 that may be located inside the hot box according to various embodiments of the present disclosure. In this embodiment, the water gas shift reactor comprises a water gas shift catalyst coating located in the anode recuperator (i.e., fuel heat exchanger) 121. For example, the catalyst may coat fins/corrugations of one or more temperature zones of the heat exchanger 121. For example, the WGS reactor 128 catalyst may be coated on the top portion of the fins/corrugations of the heat exchanger 121. Additionally or alternatively, additional components containing the water gas shift catalyst may be located downstream of the heat exchanger 121 as a stand-alone sub assembly. This assembly may comprise an annulus comprised of a catalyst coated fin section, similar to that of the ATO 140 ring.

In some embodiments, if the external fuel exhaust condenser 460 and/or the external anode exhaust cooler 560 comprise an air cooled condenser or heat exchanger, then the air may be provided from the system housing. In other words, the cabinet(s) containing the hot box and/or a power conditioning system (e.g., system output electronics, such as a DC/AC inverter, etc.) may comprise air cooled cabinets in which ambient air is circulated through the cabinet(s) by a blower or fan. This circulating cabinet air may be used to cool the fuel exhaust passing through the external fuel exhaust condenser 460 and/or the external anode exhaust cooler 560. The circulating cabinet air is kept separate from the cathode exhaust and the ATO exhaust. The circulating cabinet air which is heated by the fuel exhaust may then be provided into a CHP system, such as a building heating system.

The systems 400-700 provide the following non-limiting advantages: more power per power module, higher efficiency and potentially lower capital cost.

The fuel cell systems described herein may have other embodiments and configurations, as desired. Other components may be added if desired, as described, for example, in U.S. application Ser. No. 10/300,021, filed on Nov. 20, 2002, in U.S. Provisional Application Ser. No. 60/461,190, filed on Apr. 9, 2003, and in U.S. application Ser. No. 10/446,704, filed on May 29, 2003 all incorporated herein by reference in their entirety. Furthermore, it should be understood that any system element or method step described in any embodiment and/or illustrated in any figure herein may also be used in systems and/or methods of other suitable embodiments described above, even if such use is not expressly described.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A fuel cell system, comprising:
   a fuel cell stack;
   an anode tail gas oxidizer (ATO);
   first and second electrochemical hydrogen pump separators that each comprise an electrolyte disposed between a cathode and an anode;

a fuel exhaust conduit that fluidly connects a fuel exhaust outlet of the fuel cell stack to a splitter;

a first separation conduit that fluidly connects an outlet of the splitter to an anode inlet of one of the first or the second electrochemical hydrogen pump separators;

a second separation conduit that fluidly connects an anode outlet of one of the first or the second electrochemical hydrogen pump separators to an anode inlet of the second pump separator;

an ATO inlet conduit that fluidly connects a cathode outlet of one of the first or the second electrochemical hydrogen pump separators to the anode tail gas oxidizer;

a hydrogen conduit that fluidly connects a cathode outlet of one of the first or the second electrochemical hydrogen pump separators to a fuel inlet of the fuel cell stack; and a byproduct conduit that fluidly connects an anode outlet of one of the first or the second electrochemical hydrogen pump separator to a carbon dioxide use or storage device;

wherein:

the first separation conduit is configured to provide fuel exhaust generated by the fuel cell stack to one of the first or the second electrochemical hydrogen pump separators;

one of the first or the second electrochemical hydrogen pump separators is configured to separate hydrogen from the provided fuel exhaust; and the ATO inlet conduit is configured to provide hydrogen output from one of the first or the second electrochemical hydrogen pump separators to the ATO.

2. The fuel cell system of claim 1, wherein:

the second separation conduit is configured to provide fuel exhaust output from the first electrochemical hydrogen pump separator to the second electrochemical hydrogen pump separator;

the second electrochemical hydrogen pump separator is configured to separate hydrogen from the provided fuel exhaust;

the hydrogen conduit is configured to provide hydrogen output from the second electrochemical hydrogen pump separator to a fuel inlet stream provided to the fuel cell stack; and the byproduct conduit is configured to provide a byproduct stream comprising carbon dioxide output from the second electrochemical hydrogen pump separator to the carbon dioxide use or storage device.

3. The fuel cell system of claim 2, wherein the carbon dioxide use or storage device comprises:

a dryer configured to remove water from the carbon dioxide stream; and a cryogenic storage device configured to store carbon dioxide output from the drier as dry ice.

4. The fuel cell system of claim 1, further comprising:

a fuel inlet conduit configured to fluidly connect a fuel inlet of the fuel cell stack to a fuel source;

a recycling conduit fluidly connecting an outlet of the splitter to the fuel inlet conduit; and a mixer operatively connected to the hydrogen conduit and the recycling conduit, the mixer configured to mix hydrogen output by the second hydrogen electrochemical pump separator with fuel exhaust provided by the splitter.

5. The fuel cell system of claim 4, further comprising:

a water-gas shift reactor operatively connected to the fuel exhaust conduit; and a Venturi device operatively connected to the recycling conduit.

6. A method of operating the fuel cell system of claim 2, comprising:

operating the first electrochemical hydrogen pump separator in a constant current mode to control an amount of hydrogen that is provided to the ATO; and operating the second electrochemical hydrogen pump separator in a constant voltage mode, such that substantially all of the hydrogen is removed from the received fuel exhaust.

7. A fuel cell system comprising:

a hotbox;

a fuel cell stack disposed in the hotbox;

an anode tail gas oxidizer (ATO) disposed in the hotbox;

a fuel inlet conduit fluidly connecting a fuel source to an inlet of the fuel cell stack;

a fuel exhaust condenser disposed outside of the hotbox configured to condense water from fuel exhaust generated by the fuel cell stack and output from the hotbox;

a fuel exhaust separator configured to remove water from fuel exhaust received from the fuel exhaust condenser;

a fuel exhaust conduit fluidly connecting a fuel exhaust outlet of the fuel cell stack to the fuel exhaust condenser;

a recycling conduit fluidly connecting the fuel exhaust separator to the fuel inlet conduit;

an ATO inlet conduit fluidly connecting the recycling conduit to the ATO;

a recycling valve configured to selectively control fuel exhaust flow through the recycling conduit and into the ATO inlet conduit; and at least one feature selected from:

(i) a first feature comprising:

a bleed valve disposed on the recycling conduit, upstream of the recycling valve, with respect to a fuel exhaust flow direction through the recycling conduit; and a bleed conduit fluidly connecting the recycling conduit to the ATO inlet conduit;

wherein the bleed valve is configured to purge impurities from the fuel exhaust or provide back pressure to equalize anode and cathode pressures in the fuel cell stack; or (ii) a second feature comprising:

a fuel heat exchanger disposed in the hotbox and configured to heat a fuel inlet stream in the fuel inlet conduit using fuel exhaust output from the fuel cell stack; and an anode exhaust cooler disposed in the hotbox and configured to cool fuel exhaust output from the fuel heat exchanger using air provided to the fuel cell stack.

8. The fuel cell system of claim 7, wherein the at least one feature comprises the first feature.

9. The fuel cell system of claim 7, wherein the at least one feature comprises the second feature.

10. A method of operating a fuel cell system which comprises:

a hotbox;

a fuel cell stack disposed in the hotbox;

an anode tail gas oxidizer (ATO) disposed in the hotbox;

a fuel inlet conduit fluidly connecting a fuel source to an inlet of the fuel cell stack;

a fuel exhaust condenser disposed outside of the hotbox configured to condense water from fuel exhaust generated by the fuel cell stack and output from the hotbox;

a fuel exhaust separator configured to remove water from fuel exhaust received from the fuel exhaust condenser;

a fuel exhaust conduit fluidly connecting a fuel exhaust outlet of the fuel cell stack to the fuel exhaust condenser;

a recycling conduit fluidly connecting the fuel exhaust separator to the fuel inlet conduit;

an ATO inlet conduit fluidly connecting the recycling conduit to the ATO; and a recycling valve configured to selectively control fuel exhaust flow through the recycling conduit and into the ATO inlet conduit;

the method comprising operating the recycling valve to provide fuel exhaust to the ATO during startup operation of the system and prevent the fuel exhaust from being provided to the ATO during steady-state operation of the system.

11. The method of claim 10, wherein:
the fuel exhaust separator reduces a water content of the fuel exhaust to 12 vol % or less; and
a fuel inlet stream in the fuel inlet conduit is hydrogen fuel stream, and the fuel exhaust is substantially free of carbon.

12. The method of claim 10, further comprising using recirculating air in a cabinet containing at least one of the hot box or power conditioning subsystem to cool the fuel exhaust condenser.

13. A fuel cell system comprising:
a hotbox;
a fuel cell stack disposed in the hotbox;
an anode tail gas oxidizer (ATO) disposed in the hotbox;
a fuel inlet conduit fluidly connecting a fuel source to an inlet of the fuel cell stack;
an external anode exhaust cooler located outside the hotbox;
a fuel exhaust conduit fluidly connecting a fuel exhaust outlet of the fuel cell stack to the external anode exhaust cooler;
a recycling conduit fluidly connecting the external anode exhaust cooler to the fuel inlet conduit;
a fuel exhaust processing conduit fluidly connected to the recycling conduit;
a gas separator fluidly connected to the fuel exhaust processing conduit and configured to separate fuel exhaust received from the fuel exhaust processing conduit into streams of water, carbon dioxide, and hydrogen; and
at least one feature selected from:
(i) a first feature wherein the gas separator comprises:
a heat exchanger configured to cool the received fuel exhaust;
a compressor configured to compress the cooled fuel exhaust;
a water separator configured to remove water from the compressed fuel exhaust;
a carbon dioxide condenser configured to condense the compressed fuel exhaust to form liquid carbon dioxide; and
a distillation column configured to separate the liquid carbon dioxide from hydrogen in the condensed fuel exhaust; or (ii) a second feature comprising:
a hydrogen recycling conduit fluidly connecting a hydrogen outlet of the gas separator to the fuel inlet conduit;
an ATO inlet conduit fluidly connecting the hydrogen recycling conduit to the ATO; and
a splitter configure to selectively control hydrogen flow through the hydrogen recycling conduit and the ATO inlet conduit; or
(iii) a third feature comprising:
a fuel heat exchanger disposed in the hotbox and configured to heat hydrogen in the fuel inlet conduit using fuel exhaust output from the fuel cell stack;
an anode exhaust cooler disposed in the hotbox and configured to cool fuel exhaust output from the fuel heat exchanger using air provided to the fuel cell stack; and
a splitter located on the fuel exhaust conduit downstream of the anode exhaust cooler in the fuel exhaust flow direction, and fluidly connected to the recycle conduit and to the fuel exhaust processing conduit; or
(iii) a fourth feature comprising:
a fuel heat exchanger disposed in the hotbox and configured to heat hydrogen in the fuel inlet conduit using fuel exhaust output from the fuel cell stack;
an anode exhaust cooler disposed in the hotbox and configured to cool fuel exhaust output from the fuel heat exchanger using air provided to the fuel cell stack; and
a splitter located on the fuel exhaust conduit between the fuel heat exchanger and the anode exhaust cooler, and fluidly connected to the fuel exhaust processing conduit.

14. The fuel cell system of claim 13, wherein the at least one feature comprises the first feature.

15. The fuel cell system of claim 13, wherein the at least one feature comprises the second feature.

16. The fuel cell system of claim 15, further comprising:
an ATO mixer operatively connected to the ATO inlet conduit;
a bypass conduit fluidly connecting the fuel exhaust conduit to the ATO mixer; and
a bypass valve configured to selectively control fuel exhaust flow through the bypass conduit and the fuel exhaust conduit,
wherein the ATO mixer is configured to mix air exhaust output from the fuel cell stack with at least one of fuel exhaust provided by the bypass conduit or hydrogen provided by the ATO inlet conduit.

17. The system of claim 16, further comprising a water gas shift (WGS) reactor operatively connected to the fuel exhaust conduit, upstream of the bypass valve with respect to a fuel exhaust flow direction through the fuel exhaust conduit.

18. The system of claim 13, wherein the at least one feature comprises the third feature.

19. The system of claim 13, wherein the at least one feature comprises the fourth feature.

* * * * *